United States Patent
Kuroda

(10) Patent No.: US 7,578,001 B2
(45) Date of Patent: Aug. 18, 2009

(54) INFORMATION RECORDING AND REPRODUCING APPARATUS, INFORMATION RECORDING AND REPRODUCING METHOD AND INFORMATION RECORDING AND REPRODUCING PROGRAM

(75) Inventor: Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 949 days.

(21) Appl. No.: 10/915,692

(22) Filed: Aug. 11, 2004

(65) Prior Publication Data

US 2005/0057769 A1 Mar. 17, 2005

(30) Foreign Application Priority Data

Aug. 12, 2003 (JP) ............................. 2003-207289

(51) Int. Cl.
*G06F 7/00* (2006.01)
*H04K 1/00* (2006.01)

(52) U.S. Cl. .................... 726/31; 713/153; 380/203; 380/287

(58) Field of Classification Search ................ None
See application file for complete search history.

(56) References Cited

U.S. PATENT DOCUMENTS

| | | | | |
|---|---|---|---|---|
| 5,574,787 | A * | 11/1996 | Ryan | 380/201 |
| 6,108,423 | A | 8/2000 | Sako et al. | 380/203 |
| 6,137,952 | A * | 10/2000 | Hogan | 386/94 |
| 6,424,725 | B1 * | 7/2002 | Rhoads et al. | 382/100 |
| 7,127,744 | B2 * | 10/2006 | Levy | 726/26 |
| 7,231,042 | B2 * | 6/2007 | Kori et al. | 380/201 |
| 7,447,907 | B2 * | 11/2008 | Hart et al. | 713/176 |
| 2004/0017915 | A1 * | 1/2004 | Hisatomi | 380/202 |
| 2004/0030902 | A1 * | 2/2004 | Asano et al. | 713/176 |

FOREIGN PATENT DOCUMENTS

| | | |
|---|---|---|
| EP | 0 813 194 A2 | 12/1997 |
| EP | 0 938 091 A2 | 8/1999 |
| EP | 1 014 361 A2 | 6/2000 |
| EP | 1 162 618 A1 | 12/2001 |
| JP | 11-155125 | 6/1999 |
| JP | 11-283325 | 10/1999 |
| JP | 2000-182324 | 6/2000 |
| JP | 2000-268497 | 9/2000 |
| JP | 2001-351319 | 12/2001 |
| JP | 2002-185916 | 6/2002 |
| JP | 2003-059179 | 2/2003 |
| JP | 2003-123401 | 4/2003 |

* cited by examiner

*Primary Examiner*—Emmanuel L Moise
*Assistant Examiner*—Jeffery Williams
(74) *Attorney, Agent, or Firm*—Drinker Biddle & Reath LLP

(57) ABSTRACT

Even if copy control information in contents is Never Copy (CCI=11) and the like, a recording apparatus which is not in conformity with a copy protection system (CPS) changes the copy control information to Copy Free (CCI=00) and records the contents. A recording and reproducing apparatus which is in conformity with the CPS embeds, in a transmission signal thereof, path information indicating a path through which the contents pass, except for the contents which are originally set to Copy Free (CCI=00). Thereby, when the path information is detected though the copy control information is Copy Free (CCI=00), it is determined that the path information passed through an illegal apparatus, and hence recording can be inhibited.

12 Claims, 16 Drawing Sheets

FIG. 6

PATH A → C → F

| INPUT AND OUTPUT PATH | COPY CONTROL INFORMATION (CCI) | | PATH INFORMATION |
|---|---|---|---|
| PROVIDER 1 | NEVER COPY | COPY ONCE | O |
| AIR | 11 | 10 | O/Ai |
| RECEIVER 2 (*1) | 11 | 10 | O/Ai/Ai |
| ANALOG | 11 | 10 | O/Ai/Ai/A |
| RECORDING APPARATUS 3 (*1) | RECORDING INHIBITED | 1011 | O/Ai/Ai/A/A |
| RECORDING MEDIUM 51 (DVD-R) | | 1011 | O/Ai/Ai/A/A/R |
| REPRODUCING APPARATUS 4 (*1) | | 1011 | O/Ai/Ai/A/A/R/R |
| ANALOG | | 1011 | O/Ai/Ai/A/A/R/R/A |
| RECORDING APPARATUS 8 (*1) | | RECORDING INHIBITED | |

*1: IN CONFORMITY WITH CPS

FIG. 7

PATH B → D → G

| INPUT AND OUTPUT PATH | COPY CONTROL INFORMATION (CCI) | | PATH INFORMATION |
|---|---|---|---|
| | NEVER COPY | COPY ONCE | |
| PROVIDER 1 | | | O |
| AIR | 11 | 10 | O/Ai |
| RECEIVER 2 (*1) | 11 | 10 | O/Ai/Ai |
| ANALOG | 11 | 10 | O/Ai/Ai/A |
| RECORDING APPARATUS 5 (*2) | 00 | 00 | O/Ai/Ai/A |
| RECORDING MEDIUM 52 (DVD-R) | 00 | 00 | O/Ai/Ai/A |
| REPRODUCING APPARATUS 6 (*1) | REPRODUCI-NG INHIBITED | REPRODUCI-NG INHIBITED | |
| ANALOG | | | |
| RECORDING APPARATUS 8 (*1) | | | |

\*1: IN CONFORMITY WITH CPS
\*2: NOT IN CONFORMITY WITH CPS

FIG. 8

PATH B → E → H

| INPUT AND OUTPUT PATH | COPY CONTROL INFORMATION (CCI) | | PATH INFORMATION |
|---|---|---|---|
| | NEVER COPY | COPY ONCE | |
| PROVIDER 1 | | | O |
| AIR | 11 | 10 | O/Ai |
| RECEIVER 2 (*1) | 11 | 10 | O/Ai/Ai |
| ANALOG | 11 | 10 | O/Ai/Ai/A |
| RECORDING APPARATUS 5 (*2) | 00 | 00 | O/Ai/Ai/A |
| RECORDING MEDIUM 52 (DVD-R) | 00 | 00 | O/Ai/Ai/A |
| REPRODUCING APPARATUS 7 (*2) | 00 | 00 | O/Ai/Ai/A |
| ANALOG | 00 | 00 | O/Ai/Ai/A |
| RECORDING APPARATUS 8 (*1) | RECORDING INHIBITED | RECORDING INHIBITED | |

*1: IN CONFORMITY WITH CPS
*2: NOT IN CONFORMITY WITH CPS

FIG. 9

PATH I → K → N

| INPUT AND OUTPUT PATH | COPY CONTROL INFORMATION (CCI) | | PATH INFORMATION |
|---|---|---|---|
| PROVIDER 9 | NEVER COPY | COPY ONCE | O |
| PRERECORDED DISC 10 | 11 | 10 | O/RO |
| REPRODUCING APPARATUS 11 (*1) | 11 | 10 | O/RO/RO |
| ANALOG | 11 | 10 | O/RO/RO/A |
| RECORDING APPARATUS 12 (*1) | RECORDING INHIBITED | 1011 | O/RO/RO/A/A |
| RECORDING MEDIUM 61 (DVD-R) | | 1011 | O/RO/RO/A/A/R |
| REPRODUCING APPARATUS 13 (*1) | | 1011 | O/RO/RO/A/A/R/R |
| ANALOG | | 1011 | O/RO/RO/A/A/R/R/A |
| RECORDING APPARATUS 17 (*1) | | RECORDING INHIBITED | |

*1: IN CONFORMITY WITH CPS

FIG. 10

PATH J → L → O

| INPUT AND OUTPUT PATH | COPY CONTROL INFORMATION (CCI) | | PATH INFORMATION |
|---|---|---|---|
| | NEVER COPY | COPY ONCE | |
| PROVIDER 9 | 11 | 10 | O |
| PRERECORDED DISC 10 | 11 | 10 | O/RO |
| REPRODUCING APPARATUS 11 (*1) | 11 | 10 | O/RO/RO |
| ANALOG | 11 | 10 | O/RO/RO/A |
| RECORDING APPARATUS 14 (*2) | 00 | 00 | O/RO/RO/A |
| RECORDING MEDIUM 62 (DVD-R) | 00 | 00 | O/RO/RO/A |
| REPRODUCING APPARATUS 15 (*1) | REPRODUCING INHIBITED | REPRODUCING INHIBITED | |
| ANALOG | | | |
| RECORDING APPARATUS 17 (*1) | | | |

*1: IN CONFORMITY WITH CPS

*2: NOT IN CONFORMITY WITH CPS

FIG. 11

PATH J → M → P

| INPUT AND OUTPUT PATH | COPY CONTROL INFORMATION (CCI) | | PATH INFORMATION |
|---|---|---|---|
| PROVIDER 9 | NEVER COPY | COPY ONCE | O |
| PRERECORDED DISC 10 | 11 | 10 | O/RO |
| REPRODUCING APPARATUS 11 (*1) | 11 | 10 | O/RO/RO |
| ANALOG | 11 | 10 | O/RO/RO/A |
| RECORDING APPARATUS 14 (*2) | 00 | 00 | O/RO/RO/A |
| RECORDING MEDIUM 62 (DVD-R) | 00 | 00 | O/RO/RO/A |
| REPRODUCING APPARATUS 16 (*2) | 00 | 00 | O/RO/RO/A |
| ANALOG | 00 | 00 | O/RO/RO/A |
| RECORDING APPARATUS 17 (*1) | RECORDING INHIBITED | RECORDING INHIBITED | |

*1: IN CONFORMITY WITH CPS
*2: NOT IN CONFORMITY WITH CPS

FIG. 14

PATH J → M → P

| INPUT AND OUTPUT PATH | COPY CONTROL INFORMATION (CCI) | | PATH INFORMATION |
|---|---|---|---|
| | NEVER COPY | COPY ONCE | |
| PROVIDER 9 | 11 | 10 | O |
| PRERECORDED DISC 10 | 11 | 10 | O/RO |
| REPRODUCING APPARATUS 11 (*1) | 11 | 10 | O/RO/RO |
| ANALOG | 11 | 10 | O/RO/RO/A |
| RECORDING APPARATUS 14 (*2) | 10 | 10 | O/RO/RO/A |
| RECORDING MEDIUM 62 (DVD-R) | 10 | 10 | O/RO/RO/A |
| REPRODUCING APPARATUS 16 (*2) | 10 | 10 | O/RO/RO/A |
| ANALOG | 10 | 10 | O/RO/RO/A |
| RECORDING APPARATUS 17 (*1) | 1011 | 1011 | O/RO/RO/A/A |

*1: IN CONFORMITY WITH CPS
*2: NOT IN CONFORMITY WITH CPS

FIG. 15

PATH J → M → P

| INPUT AND OUTPUT PATH | COPY CONTROL INFORMATION (CCI) | | PATH INFORMATION | |
|---|---|---|---|---|
| | NEVER COPY | COPY ONCE | REMAINING TYPE | ERASED TYPE |
| PROVIDER 9 | NEVER COPY | COPY ONCE | O | O |
| PRERECORDED DISC 10 | 1 1 | 1 0 | O/RO | O/RO |
| REPRODUCING APPARATUS 11 (*1) | 1 1 | 1 0 | O/RO/RO | O/RO/RO |
| ANALOG | 1 1 | 1 0 | O/RO/RO/A | O/RO/RO/A |
| RECORDING APPARATUS 14 (*2) | 1 0 | 1 0 | O/RO/RO/A | |
| RECORDING MEDIUM 62 (DVD-R) | 1 0 | 1 0 | O/RO/RO/A | |
| REPRODUCING APPARATUS 16 (*2) | 1 0 | 1 0 | O/RO/RO/A | |
| ANALOG | 1 0 | 1 0 | O/RO/RO/A | |
| RECORDING APPARATUS 17 (*1) | RECORDING INHIBITED | RECORDING INHIBITED | | |

*1: IN CONFORMITY WITH CPS
*2: NOT IN CONFORMITY WITH CPS

INFORMATION RECORDING AND REPRODUCING APPARATUS, INFORMATION RECORDING AND REPRODUCING METHOD AND INFORMATION RECORDING AND REPRODUCING PROGRAM

BACKGROUND OF THE INVENTION

1. Field of the Invention

The present invention relates to an information recording technique for an information recording medium, and specially relates to copy control in recording contents.

2. Description of Related Art

Recently, a technique of recording various contents transmitted through a communication path, such as images and music, on an information recording medium, such as a DVD-R (DVD-Recordable) and a DVD-RW (DVD-Re-recordable), is spread. The contents are originally subjected to protection by a copyright. Illegally copying and distributing the information recording medium on which the contents are recorded infringe on the copyright. Therefore, various methods of inhibiting the illegal copy are necessary in order to effectively protect the copyright of the contents.

In order to prevent the illegal copy of the contents, there is known a copy protection system of preventing the illegal copy at the time of recording and transmitting the contents, by adding copy control information to the contents, e.g., by embedding it to a digital signal as an electronic watermark, or by encrypting the contents. A reproducing apparatus and a recording apparatus which are in conformity with the copy protection system can discriminate such copy control information, and can recognize permission or inhibition of copying the contents and a number of times of the copying.

There is known a method of protecting the copyright as follows. When an information signal corresponding to the contents is inputted to a predetermined apparatus, attribute information indicating an attribute of the apparatus is added to the inputted information signal. At the time of recording the information signal, the recording is controlled on the basis of the attribute information and the above-mentioned copy control information. Thereby, the illegal copy of the contents can effectively be prevented. This method is disclosed in Japanese Patent Application Laid-open under No. 2001-351319.

The above-mentioned method is effective when the contents are given and received as the digital signal. However, there sometimes occurs a problem that the illegal copy of the contents by using an illegal apparatus cannot be sufficiently eliminated, after the contents pass through an analog path.

SUMMARY OF THE INVENTION

The present invention has been achieved in order to solve the above problems. It is an object of this invention to provide an information recording and reproducing apparatus, an information recording and reproducing method and an information recording and reproducing program which can effectively inhibit reproducing and recording of contents passing through an illegal apparatus even when the contents are given and received as an analog signal, and can securely protect a copyright of the contents.

According to one aspect of the present invention, there is provided an information processing apparatus which records or reproduces information signal corresponding to contents in accordance with copy control information, including a path information detecting unit which detects path information embedded in the information signal and indicating information of a path through which the information signal passes, and a control unit which controls recording or reproducing of the information signal corresponding to the contents on the basis of the copy control information and path information detected by the path information detecting unit.

The above-mentioned information processing apparatus may be an information recording and reproducing apparatus which records and reproduces information corresponding to the contents to or from the information recording medium, such as a DVD-R and a DVD-RW. In accordance with the copy control information which prescribes permission and inhibition of copying the contents, recording and reproducing are controlled. In the present invention, the path information indicating a path through which the information signal passes during performing the recording and the reproducing by plural information recording and reproducing apparatuses is utilized. For example, the path information is information indicating the information recording and reproducing apparatus which processes the information signal of the contents subjected to the recording and reproducing, a transmission form of the information signal and whether the information signal is transmitted as the analog signal or as the digital signal. By utilizing the path information in addition to the copy control information, the information recording and reproducing apparatus determines control manner of the recording and the reproducing of the information signal corresponding to the contents, i.e., the permission or the inhibition of the recording and the reproducing of the information signal, and controls the recording and the reproducing.

The information processing apparatus may include a path information adding unit which adds new path information to the path information detected by the path information detecting unit when the information signal corresponding to the contents is inputted or outputted. Thereby, it becomes possible to update the path information corresponding to the path through which the information signal passes, and proper recording and reproducing can be performed on the basis of the path information.

In a preferred embodiment, the path information adding unit may add analog signal information which indicates that an attribute of the information signal is an analog signal when the information signal corresponding to the contents is inputted to the information processing apparatus as the analog signal or is outputted from the information processing apparatus as the analog signal, add supplying medium attribute information which indicates an attribute of a medium supplying the information signal to be recorded or reproduced by the information processing apparatus when the information signal corresponding to the contents is inputted to the information processing apparatus as a digital signal, and add recording/transmitting medium attribute information which indicates an attribute of a recording medium or a transmission medium in or to which the information signal to be recorded or reproduced by the information processing apparatus is recorded or transmitted when the information signal corresponding to the contents is outputted from the information processing apparatus as the digital signal. Thereby, it becomes possible that the control of the recording and the reproducing are performed by taking account of a form of the information signal corresponding to the contents.

As for the recording of the information signal, the control unit may prescribe not to add the path information to the information signal corresponding to the contents when the copy control information indicates a code of permitting free copy of the contents. In addition, the control unit can inhibit the recording of the information signal corresponding to the contents when the copy control information indicates a code that the copy control information permits the free copy of the contents and the path information detecting unit detects the path information. Thereby, even when a code of limiting an illegal copy is changed to a code of permitting the free copy, it can be detected that the illegal copy is performed on the basis of presence and absence of the path information, and the illegal copy can be prevented.

As for the reproducing of the information signal, the control unit may inhibit reproducing of the information signal corresponding to the contents when the supplying medium attribute information or the recording/transmitting medium attribute information is not added at the end of the path information detected by the path information detecting unit. Thereby, it can be prevented that the contents illegally recorded on the information recording medium is reproduced.

In a preferred example, the path information adding unit may add first and second adding path information as the new path information. The first adding path information may be path information of a remaining type which is not erased even if an encoding process for recording the information signal and an A/D converting process which converts the information signal corresponding to the contents from the digital signal to the analog signal are repeated by the information processing apparatus, and the second adding path information may be path information of an erased type which is erased by repeating the encoding process and the A/D converting process. The control unit may inhibit the recording of the information signal corresponding to the contents when the first and second adding path information which the path information detecting unit detects do not correspond to each other, or one of them is erased. Thereby, when the illegal copy of the contents is performed by the process of passing the analog signal, it can be detected that the illegal copy is performed by erasure of the signal of the erased type in passing the analog signal.

In some preferred examples, the second adding path information may be added to a blanking period of the information signal when the information signal corresponding to the contents is outputted as the analog signal. The second adding path information may be added to a predetermined lower bit of the information signal corresponding to the contents, and the first adding path information may be added to a bit range including a higher bit than a bit to which the second adding path information is added. In addition, the second adding path information may be added to a high frequency component of the analog signal when the information signal corresponding to the contents is outputted as the analog signal.

According to another aspect of the present invention, an information processing apparatus may include a unit which obtains an information signal corresponding to contents, a path information adding unit which adds path information indicating that the information signal passes through the information processing apparatus, and an output unit which outputs the information signal to which the path information is added.

In the above-mentioned information processing apparatus, when the information signal corresponding to the contents is transmitted via plural information processing apparatuses, the path information indicating that the information signal passes through the information processing apparatus is added to the information signal. For example, in a receiver and a set-top box which receive the contents and output them, the path information which indicates that the contents passed through the apparatuses is added to the information signal and supplied to the next stage, i.e., the recording apparatus or the reproducing apparatus. Therefore, it becomes possible to appropriately maintain the path of the information signal in the information signal.

Further, according to the identical aspect of the present invention, the information processing method which records or reproduces the information signal corresponding to the contents in accordance with the copy control information may be provided by the same manner as the above-mentioned information processing apparatus. In addition, an information processing program executed in the information processing apparatus to make the information processing apparatus operate as described above may be provided.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 6 is a table showing correspondent relations among a transmission path of contents when passing through paths A, C and F shown in FIG. 1, copy control information and path information.

FIG. 7 is a table showing correspondent relations among a transmission path of contents when passing through paths B, D and G in shown FIG. 1, copy control information and path information.

FIG. 8 is a table showing correspondent relations among a transmission path of contents when passing through paths B, E and H shown in FIG. 1, copy control information and path information.

FIG. 9 is a table showing correspondent relations among a transmission path of contents when passing through paths I, K and N shown in FIG. 2, copy control information and path information.

FIG. 10 is a table showing correspondent relations among a transmission path of contents when passing through paths J, L and O shown in FIG. 2, copy control information and path information.

FIG. 11 is a table showing correspondent relations among a transmission path of contents when passing through paths J, M and P shown in FIG. 2, copy control information and path information.

FIG. 14 is a table showing an example of copy control information updated by a process different from a process shown in FIG. 11 by an illegal apparatus, when passing through paths J, M and P shown in FIG. 2.

FIG. 15 is a table showing correspondent relations among a transmission path of contents when passing through paths J, M and P shown in FIG. 2, copy control information and two kinds of path information.

DETAILED DESCRIPTION OF THE PREFERRED EMBODIMENTS

The preferred embodiments of the present invention will now be described below with reference to the attached drawings. In the embodiments below, the description will be given of a case that the present invention is respectively applied to a recording apparatus which performs a recording operation and a reproducing apparatus which performs a reproducing operation to a disc capable of recording an information signal corresponding to various contents.

Figure 1:
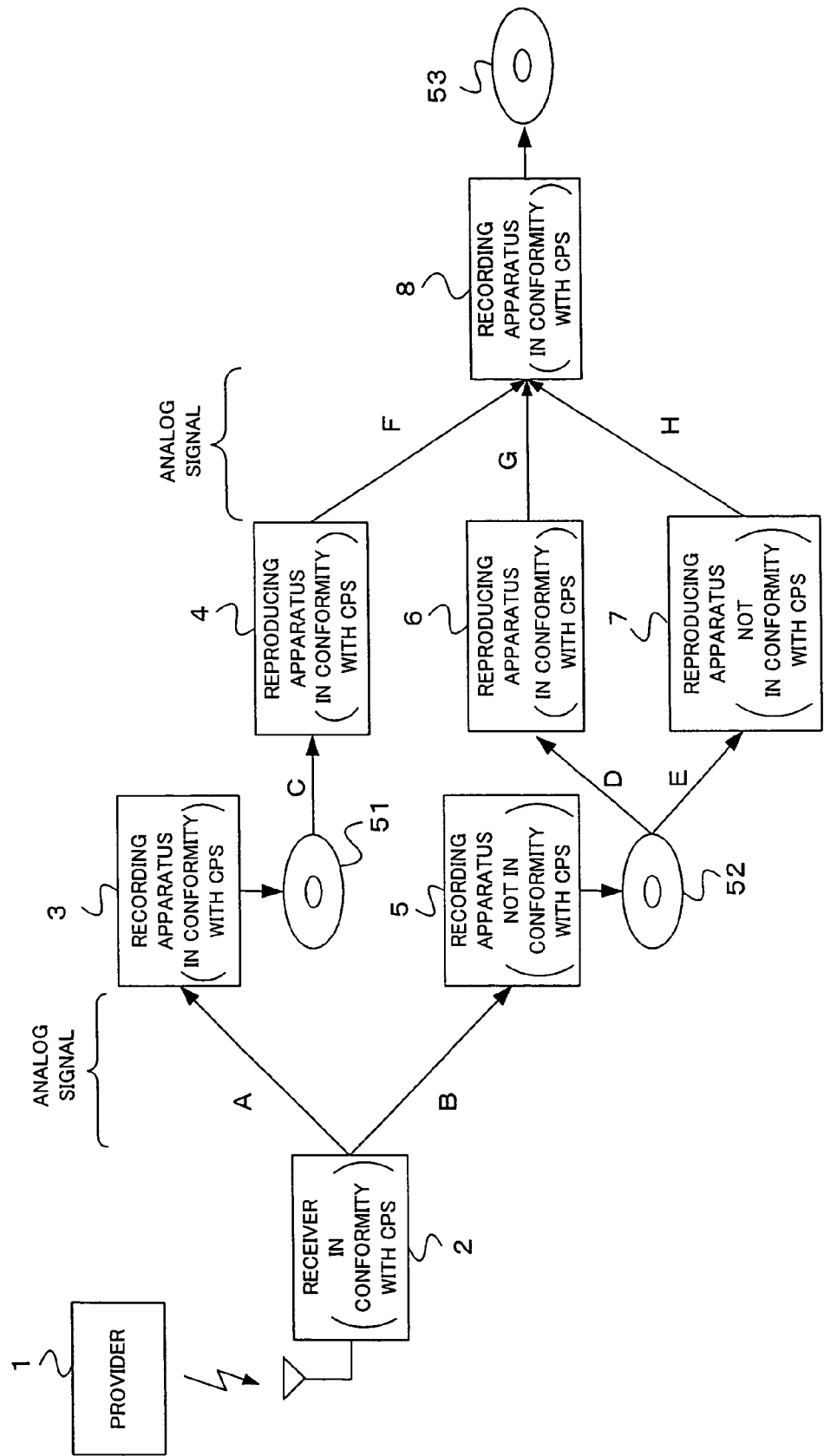
FIG. 1 is a diagram showing an example of a transmission path of contents to be recorded or reproduced.
Figure 2:
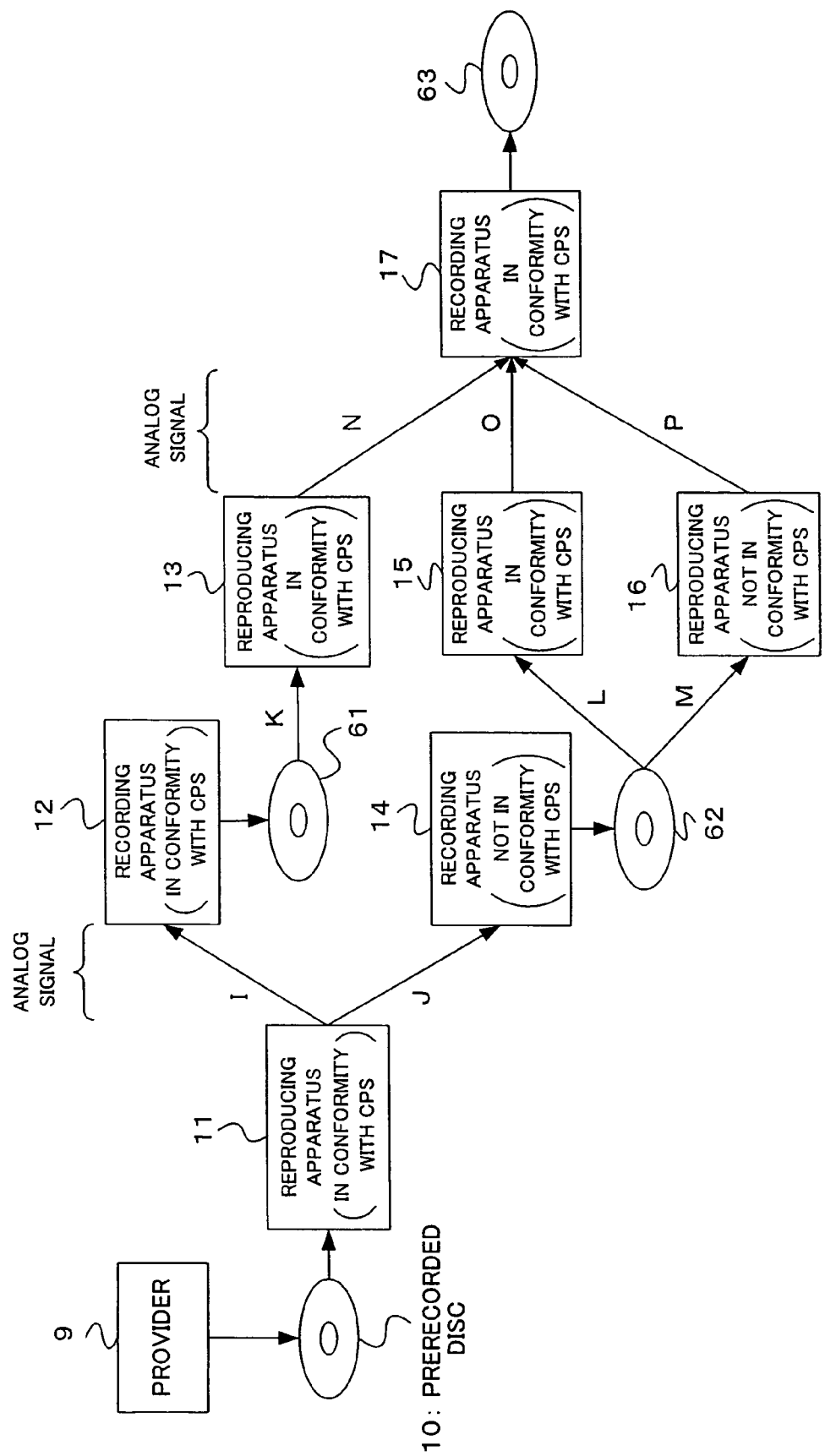
FIG. 2 is a diagram showing an example of a transmission path of contents to be recorded or reproduced, which is different from the transmission path shown in FIG. 1.

First, the description will be schematically given of the embodiment of the present invention with reference to FIG. 1 and FIG. 2. FIG. 1 and FIG. 2 are block diagrams showing system configurations for schematically explaining the present embodiment, and they are diagrams showing examples of transmission paths of contents to be recorded or reproduced. The transmission paths of the contents are representative examples which can be assumed. It is noted that mediums for supplying information of the contents are different between FIG. 1 and FIG. 2. FIG. 1 shows an example that the information of the contents is supplied from outside by electric waves, and FIG. 2 shows an example that the information of the contents is supplied by a prerecorded disc on which the information of the contents is recorded in advance.

Now, FIG. 1 will be explained. In a system configuration in FIG. 1, a provider 1 which supplies information contents, a receiver 2 which receives a signal from the provider 1, recording apparatuses 3, 5 and 8 according to the present invention, reproducing apparatuses 4, 6 and 7 according to the present invention, and recording mediums 51 to 53 in which a signal corresponding to the contents can be written are illustrated. Of those, it is assumed that the recording apparatuses 3 and 8 are in conformity with a copy protection system (CPS) according to the present invention in a predetermined recording system, and the reproducing apparatuses 4 and 6 are in conformity with the copy protection system in a predetermined reproducing system. On the other hand, it is assumed that the recording apparatus 5 and the reproducing apparatus 7 are not in conformity with the above copy protection system in the recording system and the reproducing system. It is assumed that the receiver 2 is also in conformity with the copy protection system.

Here, the description will be given of a method of protecting a copyright according to the present invention, which includes the above-mentioned copy protection system. The copy protection system has a role of protecting the copyright of the contents. Therefore, the copy control system adopts a method as follows: the copy protection system adds copy control information (CCI) to an information signal corresponding to the contents, and embeds it in the contents by a technique, such as an electronic watermark technique and the like. Examples of the copy control information are as follows: a code "Copy Once (CCI=10)" permitting only one-generation copy of the contents, a code "Never Copy (CCI=11)" inhibiting the copy of the contents, a code "Copy Free (CCI=00)" permitting free copy of the contents, a code "No More Copy (CCI=1011)" permitting the copy of the contents of the above-mentioned Copy Once (CCI=10) only once and inhibiting further copy afterward, and the like.

Further, in the present embodiment, to the signal corresponding to the contents, the path information through which the contents pass is also embedded in the contents, in addition to the above-mentioned copy control information. Thereby, an illegal copy passing an analog path is eliminated, and the protection of the copyright is reinforced. Concretely, for example, assuming that the receiver 2 receives the contents from the provider 1 and transmits the contents to the recording apparatus 3 as the analog signal, and then the recording apparatus 3 records the contents on the recording apparatus 51, the path information embedded in the contents is "0/Ai/Ai/A/A/R". "A" indicates that the contents are inputted or outputted to or from the recording apparatus or the reproducing apparatus as the analog signal. For example, in the above-mentioned example, "0" is added by the provider which supplies the contents first, and a first "Ai" indicates Air (the contents are given and received by the electric waves), and a next "Ai" indicates the receiver. A first "A" indicates that the contents are outputted as the analog signal, and a next "A" indicates that the contents are recorded as the analog signal, while an "R" indicates a DVD-R.

The path information can be detected by the recording apparatus or the reproducing apparatus according to the present embodiment. When the information signal corresponding to the contents is inputted or outputted, the recording apparatus or the reproducing apparatus adds new path information to the detected path information. Concretely, the description will be given of a rule in which the recording apparatus or the reproducing apparatus adds the path information. When the contents are inputted or outputted to or from the recording apparatus or the reproducing apparatus as the analog signal, the information indicating that the signal of the contents is the analog signal is added. When the contents are inputted by a digital signal, information indicating the medium of a supplying source of the contents to be recorded or reproduced is added. A DVD-R, a DVD-ROM, an IEEE 1394 of a digital transmission path and the like are the examples. Moreover, when the contents are outputted as the digital signal, the information indicating the recording medium or a transmission medium in which the contents to be recorded or reproduced are recorded is added. A DVD-R, a DVD-RW, an IEEE 1394 of the digital transmission path and the like are the examples.

In the present embodiment, if the copy control information is Copy Free (CCI=00), the recording apparatus or the reproducing apparatus does not add the above-mentioned path information.

Further, in FIG. 1, the signal given and received in passing the transmission paths A, B, F, G and H is assumed to be the analog signal. The transmission paths from the receiver 1 to the recording apparatuses 3 and 5 are the paths A and B, the transmission paths from the recording mediums 51 and 52 to the reproducing apparatuses 4, 6 and 7 are the paths C, D and E, and the transmission paths from the reproducing apparatuses 4, 6 and 7 to the recording apparatus 8 are the paths F, G and H. A function and a role of the path information and a method of protecting the copyright of the contents by utilizing the path information will be described later.

Next, a system configuration shown in FIG. 1 will be concretely explained. The receiver 2 has a function as a set-top box which receives information, such as images and sound transmitted from the provider 1, and demodulates the analog signal corresponding to the contents to output it outside. It is assumed that the signals, which are set to Never Copy (CCI=11), Copy Once (CCI=10) and Copy Free (CCI=00) as the copy control information, are inputted to the receiver 2.

The recording apparatuses 3 and 8 receive, from outside, the signal corresponding to the contents, and performs a recording operation to a recording medium which is set thereto. At this moment, the recording apparatuses 3 and 8 detect the above-mentioned copy control information and the path information which are added to the information to be recorded are detected, and further control a predetermined recording operation in the recording system on the basis of a detected result thereof. It is noted that concrete configurations and operations of the recording apparatuses 3 and 8 will be described later. On the other hand, though basic configuration and operation of the recording apparatus 5 is identical to those of the recording apparatuses 3 and 8, control of the recording operation on the basis of the copy control information and the path information is not performed because the recording apparatus 5 is not in conformity with the copy protection system in the recording system, as described above.

The reproducing apparatuses 4 and 6 perform a reproducing operation of the signal corresponding to the contents recorded on the recording medium which is set thereto, and output it outside. At this moment, the reproducing apparatuses 4 and 6 detect the above-mentioned copy control information and the path information which are added to the information to be reproduced, and further control a predetermined reproducing operation in the reproducing system on the basis of the detected result. It is noted that concrete configurations and operations of the reproducing apparatuses 4 and 6 will be described later, too. On the other hand, though basic configuration and operation of the reproducing apparatus 7 are identical to those of the reproducing apparatuses 4 and 6, the control of the reproducing operation on the basis of the copy control information and path information is not performed because the reproducing apparatus 7 is not in conformity with the copy protection system in the reproducing system, as described above.

As the recording mediums 51 to 53, for example, an optical disc, such as a CD-R, a CD-RW, a DVD-R, a DVD-RW and the like, is applicable.

Next, FIG. 2 will be explained. FIG. 2 is different from FIG. 1 in a medium supplying the information of the contents. In a system configuration in FIG. 2, a provider 9 which supplies information contents, a prerecorded disc 10 on which the information is recorded, recording apparatuses 12, 14 and 17 according to the present invention, reproducing apparatuses 11, 13, 15 and 16 according to the present invention, and recording mediums 61 to 63 in which the signal corresponding to the contents can be written are illustrated. It is assumed that the recording apparatuses 12 and 17 are in conformity with the copy protection system according to the present invention in a predetermined recording system, and the reproducing apparatuses 11, 13 and 15 are in conformity with the copy protection system in a predetermined reproducing system. On the other hand, it is assumed that the recording apparatus 14 and the reproducing apparatus 16 are not in conformity with the copy protection system in the above recording system and the above reproducing system. The copy protection control is performed on the basis of the above-mentioned copy control information. Further, in the present invention, in addition to the copy control information, the path information indicating the path of the contents is also embedded in the contents, and thereby protection of the copyright is reinforced.

It is assumed that the information of the analog signal is given and received in passing through the transmission paths I, J, N, O, and P shown in FIG. 2. The transmission paths from the reproducing apparatus 11 to the recording apparatuses 12 and 14 are the paths I and J, and the transmission paths from the reproducing apparatuses 13, 15 and 16 to the recording apparatus 17 are N, O and P.

The prerecorded disc 10 in FIG. 2 is a CD-ROM, a DVD-ROM and the like in which the contents, such as the images and the music supplied from the provider 9, are written.

The recording apparatuses 12 and 17, which are identical to the above-mentioned recording apparatuses 3 and 8, receive the signal corresponding to the contents from outside, and perform the recording operation to the recording medium, such as the optical disc set therein. At this moment, the recording apparatuses 12 and 17 detect the above-mentioned copy control information and the path information which are added to the information to be recorded, and control a predetermined recording operation in the recording system on the basis of a detected result thereof. It is noted that concrete configurations and operations of the recording apparatuses 12 and 17 will be explained in detail later. On the other hand, basic configuration and operation of the recording apparatus 14 are identical to those of the recording apparatuses 12 and 17. However, since the recording apparatus 14 is not in conformity with the copy protection system in the recording system as described above, the control of the recording operation on the basis of the copy control information and the path information is not performed.

The reproducing apparatuses 13 and 15 are identical to the above-mentioned reproducing apparatuses 4 and 6, and perform the reproducing operation of the signal corresponding to the contents, recorded on the recording medium set therein, to output it outside. At this moment, the reproducing apparatuses 13 and 15 detect the above copy control information and the path information which are added to the information to be reproduced, and further control a predetermined reproducing operation in the reproducing system on the basis of the detected result. It is noted that concrete configurations and operations of the reproducing apparatuses 13 and 15 will be explained in detail later. On the other hand, basic configuration and operation of the reproducing apparatus 16 are identical to those of the reproducing apparatuses 13 and 15. However, since the reproducing apparatus 16 is not in conformity with the copy protection system in the reproducing system as described above, the control of the reproducing operation on the basis of the copy control information and the path information is not performed.

As recording mediums 61 to 63, for example, the optical disc, such as a CD-R, a CD-RW, a DVD-R, a DVD-RW and the like, is applicable.

[Information Recording and Reproducing Apparatus]

Figure 3:
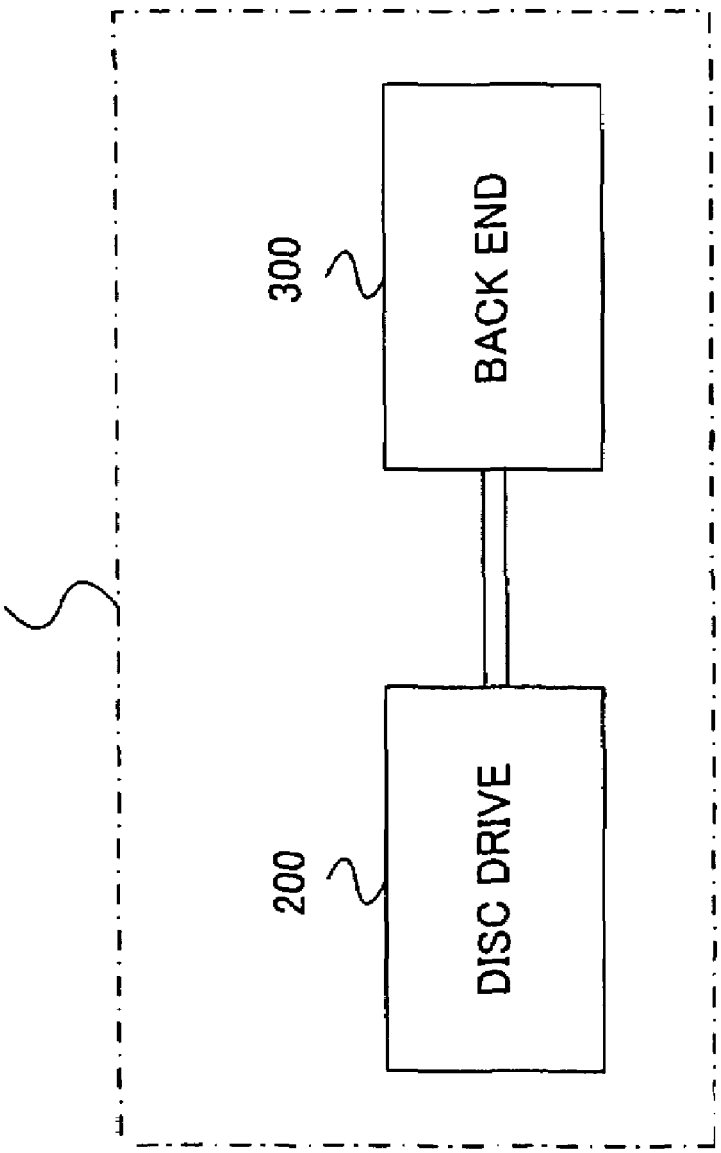
FIG. 3 is a block diagram of an information recording and reproducing apparatus being an embodiment of the present invention.

Next, the information recording and reproducing apparatus according to the present embodiment will be explained with reference to FIG. 3 to FIG. 5.

First, a configuration of an information recording and reproducing apparatus 400 will be explained. FIG. 3 shows the information recording and reproducing apparatus 400 which is the embodiment of the present invention. The information recording and reproducing apparatus 400 has two functions: a function of recording information on the recording medium, and a function of reproducing the recorded information which is recorded on the recording medium. Concretely, the information recording and reproducing apparatus 400 can reproduce a disc for recording and reproducing, such as a DVD-R, a DVD-RW and the like, and can record the information on the disc for recording and reproducing. In addition, the information recording and reproducing apparatus 400 can also reproduce a disc dedicated to reproducing, such as a DVD-ROM, a DVD video, a DVD audio and the like. The information recording and reproducing apparatus 400 includes a disc drive 200 and a back end 300.

Figure 4:
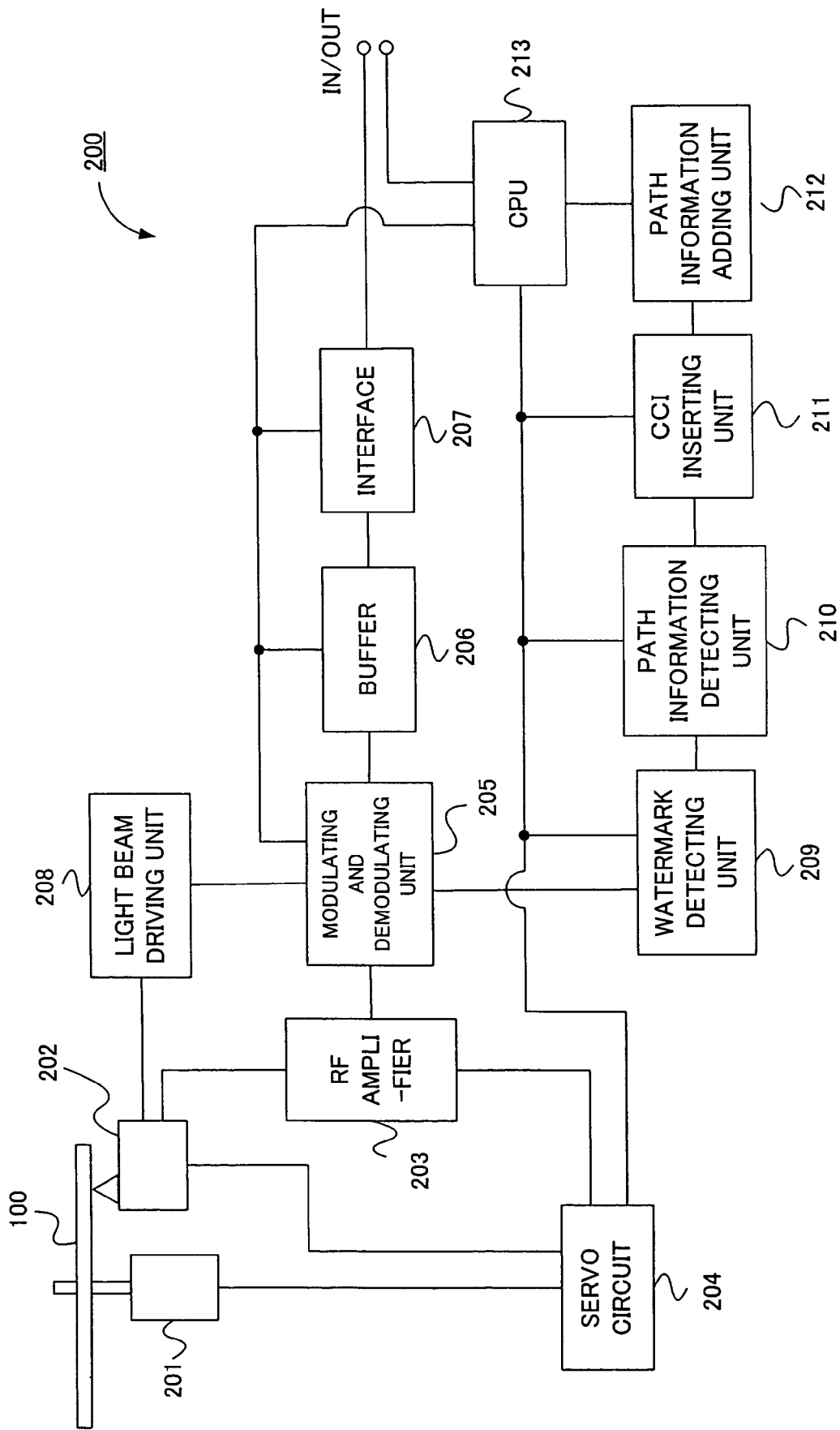
FIG. 4 is a block diagram showing a disc drive of the information recording and reproducing apparatus shown in FIG. 3.

FIG. 4 shows an inside configuration of the disc drive 200. The disc drive 200 records the information on the optical disc 100, and reads out the information which is recorded on the optical disc 100. The optical disc 100 is one of the above-mentioned disc for recording and reproducing or the above-mentioned disc dedicated to reproducing.

As shown in FIG. 4, the disc drive 200 includes a spindle motor 201, an optical pickup 202, an RF amplifier 203 and a servo circuit 204. They mainly configure a driving system of the disc drive 200 and a driving control unit thereof.

The spindle motor 201 rotates the optical disc 100.

The optical pickup 202 outputs an RF signal corresponding to a reflected light of a light beam at the time of recording and reading out the information. When the optical disc 100 adopts a wobbled land/groove system, control information, such as wobbling, lands, grooves, prepits and the like, is included in the RF signal because the wobbled lands and grooves, the prepits and the like are formed in advance on a recording surface of the optical disc 100. Moreover, when information is already recorded on the optical disc 100, the recorded information is incorporated in the RF signal, too.

The RF amplifier 203 amplifies the RF signal outputted from the optical pickup 202, and outputs the RF signal to a modulating and demodulating unit 205. Further, the RF amplifier 203 generates a wobble frequency signal, a tracking error signal, a focus error signal and the like from the RF signal, and outputs them.

The servo circuit 204 is a servo control circuit which controls the driving of the optical pickup 202 and the spindle motor 201 on the basis of the tracking error signal, the focus error signal and the other servo control signal. Concretely, the servo circuit 204 controls a positional relation between the optical pickup 202 and the optical disc 100 on the basis of the tracking error signal. The servo circuit 204 controls focusing of the light beam of the optical pickup 202 on the basis of the focus error signal.

Moreover, as shown in FIG. 4, the disc drive 200 includes the modulating and demodulating unit 205, a buffer 206, an interface 207 and a light beam driving unit 208. The components mainly demodulates and outputs the recorded information which is read out from the optical disc 100, and receives and modulates the recorded information to be recorded on the optical disc 100.

The modulating and demodulating unit 205 is a circuit which has two functions: a function of performing error correction of the recording information at the time of reading out the information, and a function of adding an error correction code to the recording information at the time of recording the information and modulating it. Concretely, at the time of reading out the information, the modulating and demodulating unit 205 demodulates the RF signal outputted from the RF amplifier 203, and performs the error correction to it to output it to the buffer 206. In addition, at the time of recording the information, the modulating and demodulating unit 205 adds the error correction code to the recording information outputted from the buffer 206, and modulates it so as to be adapted to the optical identification of the optical disc 100. Afterward, the modulated recording information is outputted to the light beam driving unit 208.

The buffer 206 is a storing circuit which temporarily stores the recording information.

The interface 207 is a circuit which performs input and output control or communication control of the recording information between the disc drive 200 and the back end 300. Concretely, at the time of reproducing the information, the interface 207 outputs, to the back end 300, the recording information outputted from the buffer 206 (i.e., the recording information which is read out from the optical disc 100), in response to a request command from the back end 300. In addition, at the time of recording the information, the interface 207 receives the recording information inputted from the back end 300 to the disc drive 200, and outputs it to the buffer 206.

Further, as shown in FIG. 4, the disc drive 200 includes a watermark detecting unit 209, a path information detecting unit 210, a CCI inserting unit 211 and a path information adding unit 212.

The watermark detecting unit 209 detects a watermark embedded in the contents, i.e., data embedded as an electronic watermark. In the present embodiment, the above-mentioned copy control information can be extracted from the watermark which the watermark detecting unit 209 detects. The path information detecting unit 210 detects the above-mentioned path information embedded in the contents. The copy control information and the path information detected from the contents are inputted to a CPU 213 or a drive control unit 301 which will be explained later in order to determine whether the copy information and the path information should be reproduced or recorded.

On the other hand, the CCI inserting unit 211 inserts the watermark, in which the copy control information is updated on the basis of a detected result by the watermark detecting unit 209, to the signal of the contents to be recorded on the optical disc 100. For example, in recording the contents on the recording medium, if the copy control information is Copy Once (CCI=10), the CCI inserting unit 211 updates the copy control information to No More Copy (CCI=1011).

The path information adding unit 212 can add new path information to the path information which the path information detecting unit 210 detects. For example, in recording the contents on a DVD-R, if the path information detecting unit 210 detects the path information "0/Ai/Ai/A/A", the path information adding unit 212 adds "R" to the path information. Then, the path information "0/Ai/Ai/A/A/R" is embedded in the contents.

As for updating the copy control information and the path information, when the CPU 213 or the drive control unit 301 determines that reproducing or recording is permitted on the basis of the above-mentioned detected information, the path information is updated. When the copy control information is Copy Once (CCI=10) at the time of recording the information, the copy control information is updated to No More Copy (CCI=1011). The copy control information and the path information thus updated are inputted to the back end 300 outside at the time of reproducing the information, and are inputted to the modulating and demodulating unit 205 at the time of recording the information. On the other hand, when the CPU 213 or the drive control unit 301 determines that reproducing or recording is not permitted, the copy control information and the path information are not updated.

The CPU 213 controls whole the disc drive 200, and controls and manages the above-mentioned giving and receiving of the information among each component in the disc drive 200. For example, in the present embodiment, whether reproducing or recording is permitted or not is determined on the basis of the copy control information and the path information which the watermark detecting unit 209 and the path information detecting unit 210 detect. When it is determined that recording or reproducing is permitted, the path information is updated. When the copy control information is Copy Once (CCI=10) at the time of recording the information, the copy control information is updated. Then, the CPU 213 requests to embed them in the contents. Moreover, according to the request command transmitted from the back end 300 which will be described later, the CPU 213 executes control of a recording operation of the optical pickup 202 and control of outputting the recording information stored in the buffer 206 to the back end 300. Thereby, normal reproducing control and first-reading control of the contents information are executed.

Next, the description will be given of an inside configuration of the back end 300 shown in FIG. 5. The back end 300 performs a reproducing process of the recording information which is read out from the optical disc 100 by the disc drive 200. Also, the back end 300 receives the recording information which is supplied from outside in order to be recorded on the optical disc 100, and compresses (encodes) and transmits it to the disc drive 200.

Figure 5:
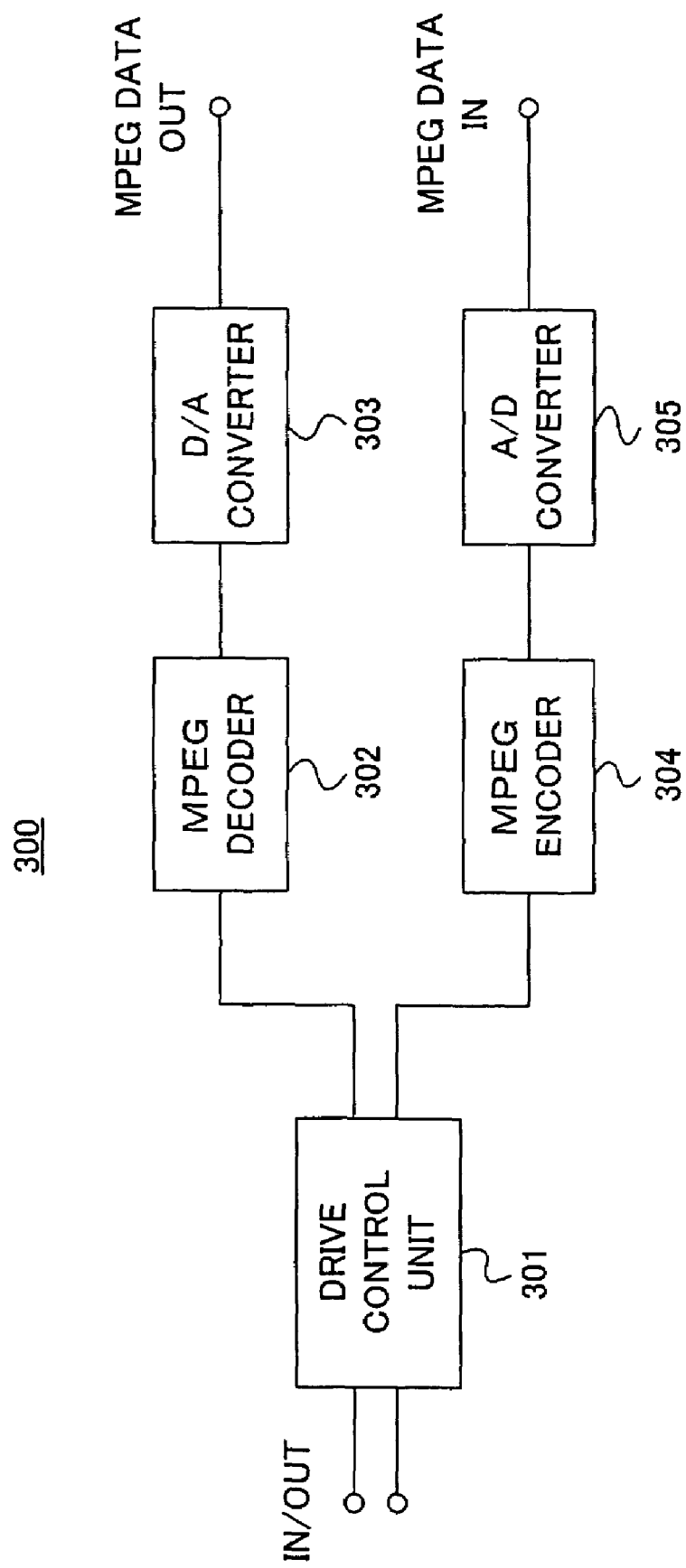
FIG. 5 is a block diagram showing a back end of the information recording and reproducing apparatus shown in FIG. 3.

As shown in FIG. 5, the back end 300 includes the drive control unit 301, an MPEG decoder 302, a D/A converter 303, an MPEG encoder 304 and an A/D converter 305.

The drive control unit 301 is a circuit which controls a reading process and a recording process of the disc drive 200. The back end 300 and the disc drive 200 perform, in cooperation with each other, an operation of reading out the recording information from the optical disc 100 to reproduce it, and an operation of receiving the information to be recorded from the outside to record it on the optical disc 100. The drive control unit 301 realizes the cooperation between the back end 300 and the disc drive 200 by controlling the reading process and the recording process of the disc drive 200. Concretely, the drive control unit 301 outputs, to the disc drive 200, the request command about reproduction, recording and outputting of the recording information from the buffer 206. Further, in the present embodiment, the drive control unit 301 can also perform the input and output control for controlling input or output of the watermark detecting unit 209, the path information detecting unit 210, the CCI inserting unit 211 and the path information adding unit 212, identically to the above-mentioned CPU 213.

The MPEG decoder 302 demodulates a video signal of a moving picture, which is read out from the optical disc 100 by the disc drive 200 and is supplied via the drive control unit 301, on the basis of an MPEG demodulating system. The demodulated information is converted from the digital signal to the analog signal by the D/A converter 303. By such process, the contents information is converted into a state reproducible by a display and the like. When the recording information is audio information, an audio decoder which is not shown demodulates the audio information, and converts it to an audio signal reproducible by a speaker and the like to output it to the speaker and the like.

The video signal inputted from outside to be recorded on the optical disc 100 is converted from the analog signal to the digital signal by the A/D converter 305. The MPEG encoder 304 receives the video signal converted to the digital signal, and compresses (encodes) it on the basis of an MPEG encoding system. The compressed signal is inputted to the disc drive 200 via the drive control unit 301.

1st Embodiment

Next, the description will be given of recording and reproducing control according to a first embodiment with reference to FIG. 6 to FIG. 13.

Now, the first embodiment will be schematically explained. The recording and reproducing control according to the first embodiment has two main characteristics. Now, a first characteristic will be explained. Generally, the recording apparatus which is not in conformity with the CPS forcibly changes the copy control information embedded in the contents from CCI=10 to CCI=00 in recording the contents. In the normal contents, the signal of the contents whose copy control information is set to CCI=10 or CCI=11 is encrypted, and the contents are decrypted to be a plaintext when the contents are inputted as analog signal to the recording apparatus which is not in conformity with the CPS. The recording apparatus which is not in conformity with the CPS has to encrypt the contents again in outputting the contents in order to make the copy control information CCI=11 and CCI=10, and hence changes the copy control information to CCI=00 for convenience. As described above, in the conventional method of protecting the copyright, when the recording apparatus which is not in conformity with the CPS is utilized, the contents become a state of "Copy Free" and the illegal copy of the contents is possible.

In the present embodiment, since not only the copy control information but also the path information are added to the contents, the above illegal copy can be prevented. A method of effectively utilizing the path information will be explained. In the present embodiment, as described above, if the copy control information is CCI=00, the path information is not embedded to the contents. Therefore, no path information is written in the contents which are obtained via a proper path. However, when the recording apparatus which is not in conformity with the CPS forcibly changes the copy control information to CCI=00 at the time of recording operation, the path information up to the recording apparatus is embedded in the contents. Therefore, in the first embodiment, in the case of CCI=00, whether the contents are illegal or not is determined by taking account of whether the path information exists or not. Thereby, the protection of the copyright is possible.

Next, the description will be given of a second characteristic of the recording and reproducing control according to the first embodiment. When the recording apparatus which is in conformity with the CPS records the contents in the recording medium, or when the reproducing apparatus which is in conformity with the CPS reproduces the recording medium in which the contents are recorded, a name of the recording medium or the transmission medium itself is necessarily added at the end of the path information embedded in the contents in the recording medium or the transmission medium after performing the recording or the reproducing. The name of the recording medium itself in which the contents are recorded is, for example, a DVD-R, a DVD-ROM and an IEEE 1394 of the digital transmission path. However, when the recording or the reproducing is performed by the apparatus which is not in conformity with the CPS, the path information recorded in the recording medium is not updated, and hence the name of the recording medium is never written at the end of the path information. In the first embodiment, by taking account of that point, when the name of the recording medium is not added at the end of the path information embedded in the contents in the recording medium in which the contents are recorded, it is determined that the recording is performed by the apparatus which is not in conformity with the CPS, and the contents are not reproduced. Thereby, the protection of the copyright is achieved.

Next, the description will be given of an embodiment to which a recording and reproducing control method of the first embodiment is concretely applied with reference to FIG. 6 to FIG. 11. FIG. 6 to FIG. 11 are tables showing correspondent relations among the transmission paths of the contents, the copy control information and the path information which are embedded in the above-mentioned contents. On the left column of the tables, input and output paths of the contents are indicated. Moreover, when the signal of the contents is outputted as the analog signal, "ANALOG" is indicated. At the center column of the tables, it is indicated how the copy control information is changed when the contents pass through the above-mentioned transmission path. In FIG. 6 to FIG. 11, it is assumed that the copy control information which is originally set to the contents is Never Copy (CCI=11), Copy Once (CCI=10) or Copy Free (CCI=00). In the present invention, when the copy control information which is originally set is Copy Free (CCI=00), the copy control information is not updated, and the path information is not added. Therefore, those cases are omitted from the illustration in the tables. Further, the path information which is added and embedded by a predetermined apparatus at the time of passing through the above-mentioned transmission path is indicated on the right column of the tables.

FIG. 6 is a table showing correspondent relations among the transmission path of the contents when passing through the paths A, C and F in FIG. 1, the copy control information and the path information. The concrete path is for transmitting the signal of the contents from the provider 1 to the receiver 2, the recording apparatus 3 which is in conformity with the CPS, the recording medium 51, the reproducing apparatus 4 which is in conformity with the CPS, the recording apparatus 8 which is in conformity with the CPS and the recording medium 53 in sequence. FIG. 6 shows an example that the recording medium 51 is a DVD-R. FIG. 6 shows an example of inhibiting the illegal copy by only the copy control information embedded in the contents.

When the copy control information which is originally set to the contents is Never Copy (CCI=11), the recording apparatus 3 which is in conformity with the CPS determines that the copy control information is Never Copy (CCI=11) if the signal of the contents is transmitted by the above-mentioned path. Thus, the recording to the recording medium 51 is inhibited. On the other hand, when the copy control information which is originally set to the contents is Copy Once (CCI=10), the recording apparatus 3 which is in conformity with the CPS records the contents and updates the copy control information to No More Copy (CCI=1011). When the recording medium 51 thus produced is reproduced by the reproducing apparatus 4 which is in conformity with the CPS and the reproduced contents are recorded by the recording apparatus 8 which is in conformity with the CPS, the recording apparatus 8 determines that the copy control information is No More Copy (CCI=1011), and therefore the recording to the recording medium 53 is inhibited.

FIG. 7 is a table showing correspondent relations among the transmission path of the contents when passing through the paths B, D and G in FIG. 1, the copy control information and the path information. The concrete path is for transmitting the signal of the contents from the provider 1 to the receiver 2, the recording apparatus 5 which is not in conformity with the CPS, the recording medium 52, the reproducing apparatus 6 which is in conformity with the CPS, the recording apparatus 8 which is in conformity with the CPS and the recording medium 53 in sequence. FIG. 7 shows an example that the recording medium 52 is a DVD-R. FIG. 7 shows an example that the reproducing of the recording medium produced by the illegal copy is inhibited on the basis of the copy control information and the path information.

When the copy control information which is originally set to the contents is Never Copy (CCI=11), the recording apparatus 5 which is not in conformity with the CPS performs the recording regardless of CCI=11 if the signal of the contents is transmitted by the above-mentioned path, and changes the copy control information to Copy Free (CCI=00). At this moment, the path information is not updated and is maintained "0/Ai/Ai/A". When the recording medium 52 thus produced is reproduced by the reproducing apparatus 6 which is in conformity with the CPS, the reproducing apparatus 6 determines that no name of the recording medium is at the end of the path information, and hence the reproducing is inhibited as described above. On the other hand, identically, when the copy control information which is originally set to the contents is Copy Once (CCI=10), the recording apparatus 5 which is not in conformity with the CPS performs the recording, and changes the copy control information to Copy Free (CCI=00). At this moment, the path information is not updated and is maintained "0/Ai/Ai/A". When the recording medium 52 thus produced is reproduced by the reproducing apparatus 6 which is in conformity with the CPS, the reproducing apparatus 6 determines that no name of the recording medium is at the end of the path information, and hence the reproducing is inhibited.

FIG. 8 is a table showing correspondent relations among the transmission path of the contents when passing through the paths B, E and H in FIG. 1, the copy control information and the path information. The concrete path is for transmitting the signal of the contents from the provider 1 to the receiver 2, the recording apparatus 5 which is not in conformity with the CPS, the recording medium 52, the reproducing apparatus 7 which is not in conformity with the CPS, the recording apparatus 8 which is in conformity with the CPS, and the recording medium 53 in sequence. FIG. 8 shows an example that the recording medium 52 is a DVD-R. FIG. 8 shows an example that the copy of the contents illegally transmitted is inhibited on the basis of the copy control information and the path information.

When the copy control information which is originally set to the contents is Never Copy (CCI=11),the recording apparatus 5 which is not in conformity with the CPS performs the recording regardless of CCI=11 if the signal of the contents is transmitted by the above-mentioned path, and changes the copy control information to Copy Free (CCI=00). The recording medium 52 thus produced is reproduced by the reproducing apparatus 7 which is not in conformity with the CPS. When the contents reproduced by the reproducing apparatus 7 is recorded by the recording apparatus 8 which is in conformity with the CPS, the recording apparatus 8 determines that the path information is written though the copy control information is Copy Free (CCI=00), and hence the recording to the recording medium 53 is inhibited. On the other hand, identically, when the copy control information which is originally set to the contents is Copy Once (CCI=10), the recording apparatus 5 which is not in conformity with the CPS records the contents and changes the copy control information to Copy Free (CCI=00). When the recording medium 52 thus produced is reproduced by the reproducing apparatus 7 which is not in conformity with the CPS to be recorded by the recording apparatus 8 which is in conformity with the CPS, the recording apparatus 8 determines that the path information is written though the copy control information is Copy Free (CCI=00), and hence the recording in the recording medium 53 is inhibited as described above.

Next, an example in a case that the contents are transmitted by the transmission paths shown in FIG. 2 will be described. FIG. 2 is different from FIG. 1 in a medium supplying the information of the contents. FIG. 2 shows the case that the contents are supplied from the prerecorded disc 10 on which the information of the contents is recorded in advance, such as a DVD-ROM.

FIG. 9 is a table showing correspondent relations among the transmission path of the contents when passing through the paths I, K and N in FIG. 2, the copy control information and the path information. The concrete path is for transmitting the signal of the contents from the prerecorded disc 10 which records the contents supplied by the provider 9, to the reproducing apparatus 11 which is in conformity with the CPS, the recording apparatus 12 which is in conformity with the CPS, the recording medium 61, the reproducing apparatus 13 which is in conformity with the CPS, the recording apparatus 17 which is in conformity with the CPS and the recording medium 63 in sequence. FIG. 9 shows an example that the recording medium 61 is a DVD-R. FIG. 9 shows an example that the illegal copy is inhibited by only the copy control information embedded in the contents.

When the copy control information which is originally set to the contents is Never Copy (CCI=11), the recording apparatus 12 which is in conformity with the CPS determines that the copy control information is Never Copy (CCI=11) if the signal of the contents is transmitted by the above-mentioned path, and hence the recording to the recording medium 61 is inhibited. On the other hand, when the copy control information which is originally set to the contents is Copy Once (CCI=10), the recording apparatus 12 which is in conformity with the CPS performs the recording of the contents and updates the copy control information to the No More Copy (CCI=1011). When the recording medium 61 thus produced is reproduced by the reproducing apparatus 13 which is in conformity with the CPS, and the reproduced contents are recorded by the recording apparatus 17 which is in conformity with the CPS, the recording apparatus 17 determines that the copy control information is No More Copy (CCI=1011), and hence the recording to the recording medium 63 is inhibited.

FIG. 10 is a table showing correspondent relations among the transmission path of the contents when passing through the paths J, L and O in FIG. 2, the copy control information and the path information. The concrete path is for transmitting the signal of the contents from the prerecorded disc 10 which records the contents supplied by the provider 9, to the reproducing apparatus 11 which is in conformity with the CPS, the recording apparatus 14 which is not in conformity with the CPS, the recording medium 62, the reproducing apparatus 15 which is in conformity with the CPS, the recording apparatus 17 which is in conformity with the CPS and the recording medium 63 in sequence. FIG. 10 shows an example that the recording medium 62 is a DVD-R. FIG. 10 shows an example that the reproducing of the recording medium produced by the illegal copy is inhibited on the basis of the copy control information and the path information.

When the copy control information which is originally set to the contents is Never Copy (CCI=11), the recording apparatus 14 which is not in conformity with the CPS performs the recording regardless of CCI=11 if the signal of the contents is transmitted by the above-mentioned path, and changes the copy control information to Copy Free (CCI=00). At this moment, the path information is not updated and is maintained "0/RO/RO/A" embedded by the reproducing apparatus 11 which is in conformity with the CPS (e.g., "RO" indicates the DVD-ROM). When the recording medium 62 thus produced is reproduced by the reproducing apparatus 15 which is in conformity with the CPS, the reproducing apparatus 15 determines that no name of the recording medium is at the end of the path information, and hence the reproducing is inhibited. On the other hand, identically, when the copy control information which is originally set to the contents is Copy Once (CCI=10), the recording apparatus 14 which is not in conformity with the CPS performs the recording and changes the copy control information to Copy Free (CCI=00). At this moment, the path information is not updated and is maintained "0/RO/RO/A". When the recording medium 62 thus produced is reproduced by the reproducing apparatus 15 which is in conformity with the CPS, the reproducing apparatus 15 determines that no name of the recording medium is at the end of the path information, and hence the reproducing is inhibited.

FIG. 11 is a table showing correspondent relations among the transmission path of the contents when passing through the paths J, M and P in FIG. 2, the copy control information and the path information. The concrete path is for transmitting the signal of the contents from the prerecorded disc 10 which records the contents supplied by the provider 9, to the reproducing apparatus 11 which is in conformity with the CPS, the recording apparatus 14 which is not in conformity with the CPS, the recording medium 62, the reproducing apparatus 16 which is not in conformity with the CPS, the recording apparatus 17 which is in conformity with the CPS and the recording medium 63 in sequence. FIG. 11 shows an example that the recording medium 62 is a DVD-R. FIG. 11 shows an example that the copy of the contents illegally transmitted is inhibited on the basis of the copy control information and the path information.

When the copy control information which is originally set to the contents is Never Copy (CCI=11), if the signal of the contents is transmitted by the above-mentioned path, the recording apparatus 14 which is not in conformity with the CPS performs the recording regardless of CCI=11 and changes the copy control information to Copy Free (CCI=00). The recording medium 62 thus produced is reproduced by the reproducing apparatus 16 which is not in conformity with the CPS. When the contents reproduced by the reproducing apparatus 16 is recorded by the recording apparatus 17 which is in conformity with the CPS, the recording apparatus 17 determines that the path information is written though the copy control information is Copy Free (CCI=00), and hence the recording to the recording medium 63 is inhibited, as described above. On the other hand, identically, when the copy control information which is originally set to the contents is Copy Once (CCI=10), the recording apparatus 14 which is not in conformity with the CPS records the contents and changes the copy control information to Copy Free (CCI=00). When the recording medium 62 thus produced is reproduced by the reproducing apparatus 16 which is not in conformity with the CPS to be recorded by the recording apparatus 17 which is in conformity with the CPS, the recording apparatus 17 determines that the path information is written though the copy control information is Copy Free (CCI=00), and hence the recording in the recording medium 63 is inhibited, as described above.

Next, the description will be given of reproducing and recording operations performed by the information recording and reproducing apparatus 400 which is in conformity with the CPS in the first embodiment with reference to FIG. 12 and FIG. 13.

Figure 12:
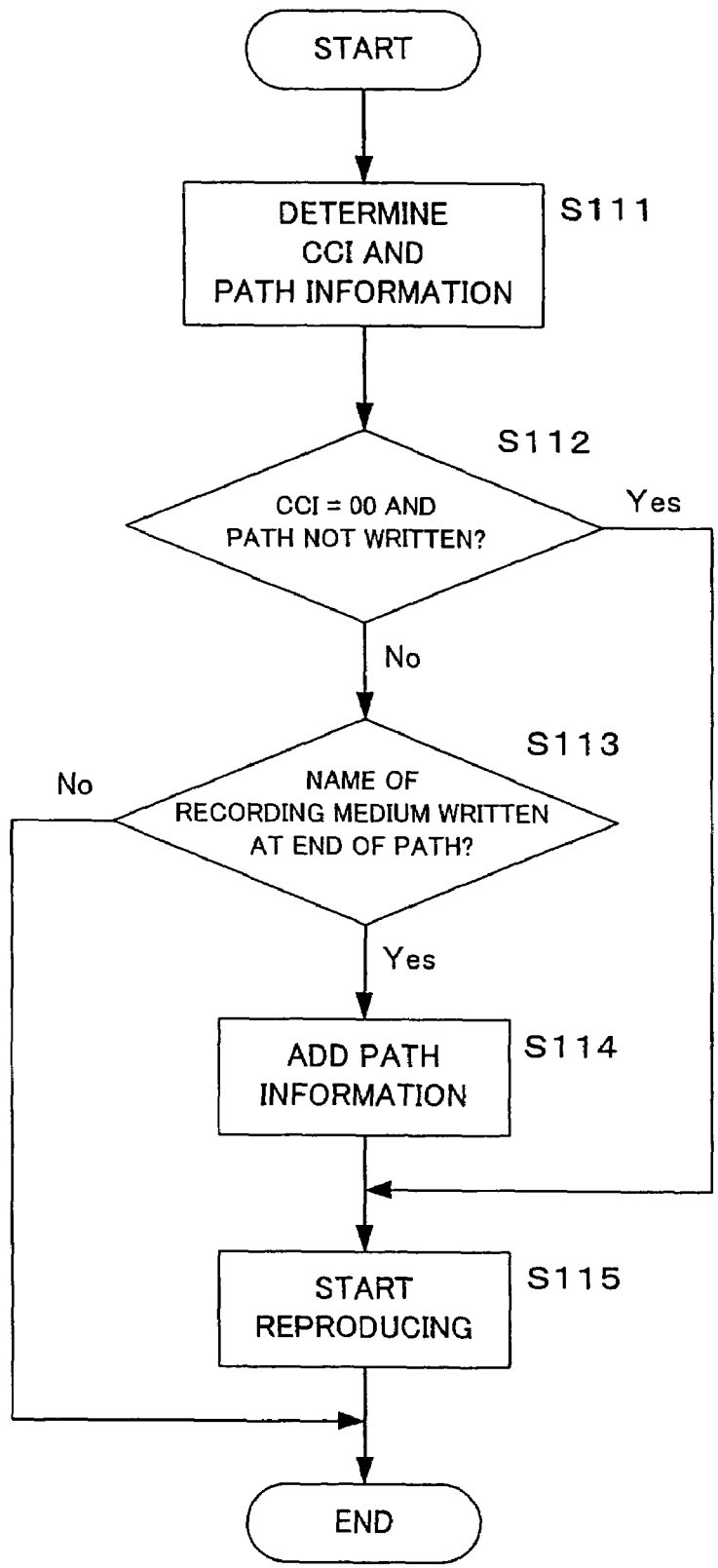
FIG. 12 is a flow chart showing a procedure of a reproducing process according to a first embodiment.
Figure 13:
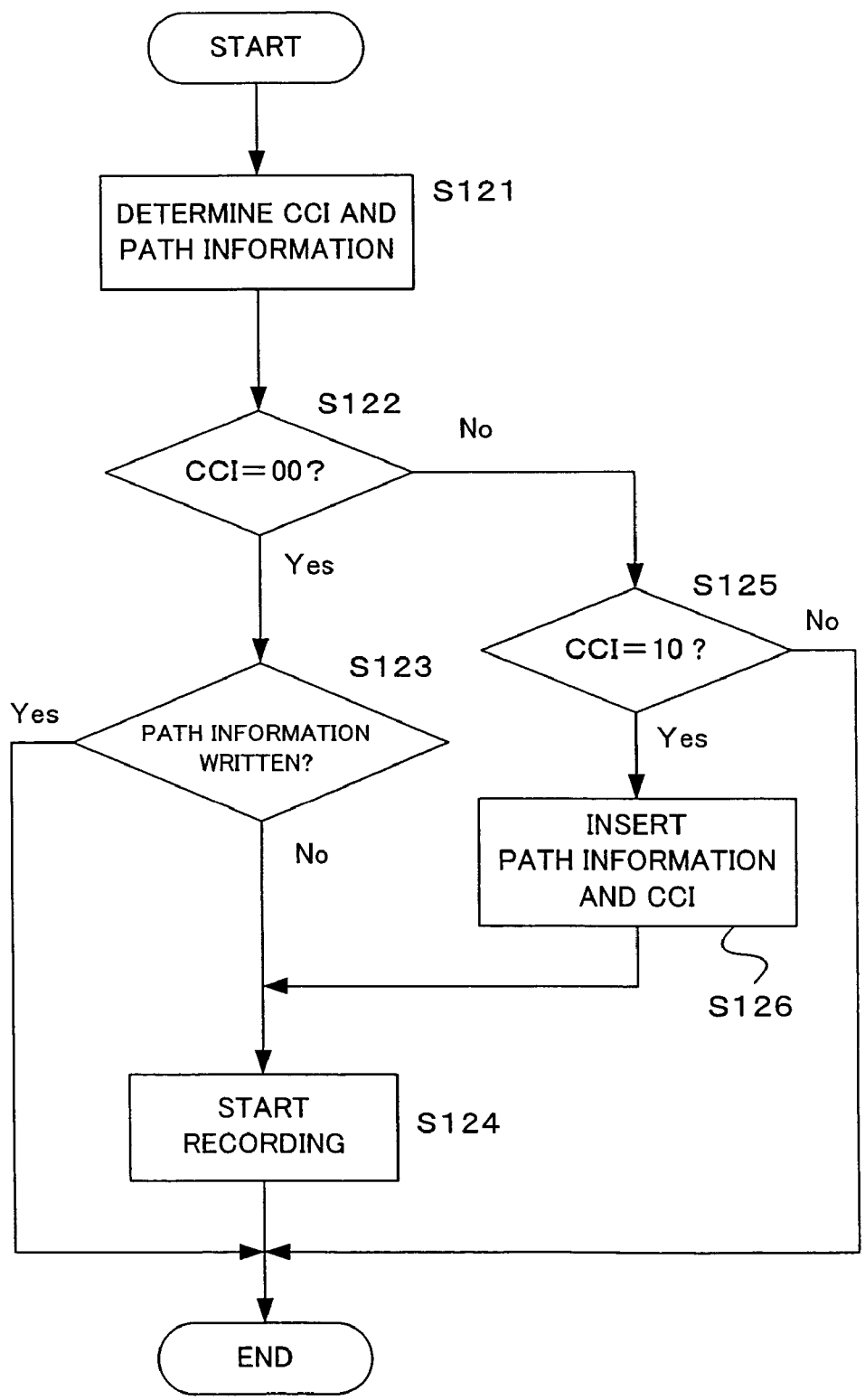
FIG. 13 is a flow chart showing a procedure of a recording process according to the first embodiment.

FIG. 12 is a flow chart showing the reproducing operation performed by the information recording and reproducing apparatus 400 which is in conformity with the CPS in the first embodiment. As described above, a process is performed by taking account of whether the path information is written or not though the copy control information of the contents to be reproduced is Copy Free (CCI=00), and whether the name of the recording medium in which the contents are recorded is written at the end of the path information or not.

First, in step S111, the watermark detecting unit 209 and the path information detecting unit 210 detect the copy control information and the path information which are embedded in the contents recorded on the recording medium and on the prerecorded disc. The CPU 213 or the drive control unit 301 determines the copy control information and the path information on the basis of the detected result.

Next, in step S112, on the basis of the determined result in step S111, whether the path information is written and the copy control information is Copy Free (CCI=00) or not is determined. Namely, whether the copy control information is originally set to the Copy Free (CCI=00) which permits copying the contents for unlimited times or not is determined. In other words, whether it is the contents forcibly changed to Copy Free (CCI=00) by the apparatus which is not in conformity with the CPS or not is determined. It is noted that the CPU 213 or the drive control unit 301 can execute the determination, too. When the determined result in step S112 is "Yes", the process goes to step S115, and the reproducing operation of the contents is executed.

On the other hand, when the determined result in step S112 is "No", the process goes to step S113. In step S113, the CPU 213 or the drive control unit 301 determines whether the name of the recording medium is written at the end of the path information embedded in the contents or not. For example, it is determined whether "R" indicating the DVD-R or "RO" indicating the DVD-ROM is written at the end of the path information or not. As described above, when the apparatus which is not in conformity with the CPS records the contents to the recording medium, no name of the recording medium is written at the end of the path information because the path information at this time is not embedded in the contents. Therefore, by determining whether the name of the recording medium is written at the end of the path information or not, it is possible to inhibit the reproducing of the contents which passed through the illegal path. When the determined result in step S113 is "No", the process goes out of the routine (the process does not go to steps S114 and S115), and the reproducing operation of the contents is not performed.

On the other hand, when the determined result in step S113 is "Yes", the process goes to step S114, and the path information adding unit 212 inserts new path information. The process goes to step S115, and the reproducing operation of the contents is performed.

Next, the description will be given of the recording operation performed by the information recording and reproducing apparatus which is in conformity with the CPS in the first embodiment with reference to FIG. 13. FIG. 13 is a flow chart showing the recording operation performed by the information recording and reproducing apparatus which is in conformity with the CPS. The process is performed by mainly taking account of whether the path information is written or not though the copy control information of the contents to be reproduced is Copy Free (CCI=00).

First, in step S121, the watermark detecting unit 209 and the path information detecting unit 210 detect the copy control information and the path information embedded in the contents, which is supplied from the receiver to the recording apparatus or which is supplied to the recording apparatus by reading out the recording medium. The CPU 213 or the drive control unit 301 determines the copy control information and the path information on the basis of the detected result.

Next, in step S122, the CPU 213 or the driving control unit 301 determines whether the copy control information is Copy Free (CCI=00) or not on the basis of the determined result in step S121.

When the copy control information is determined to be Copy Free (CCI=00) (step S122; Yes), the process goes to step S123, and whether the path information is written in the contents or not is determined. When passing through the apparatus which is not in conformity with the CPS, the copy control information is forcibly changed from CCI=11 or CCI=10 to CCI=00, as described above, but the path information is maintained as it is. Therefore, when the copy control information is Copy Free (CCI=00) and the path information is written, it means that the contents passed through the apparatus which is not in conformity with the CPS. By performing the determination by taking account of that point, it is possible to inhibit the recording of the contents which passed through the illegal path. It is noted that the CPU 213 or the drive control unit 301 can perform the determination, too. When the determined result in step S123 is "Yes", the process goes out of the routine (the process does not go to step S124), and the recording operation of the contents is not performed.

When the determined result in step S123 is "No", the process goes to step S124, and the recording operation of the contents is performed. In the case, the recording is never inhibited because it is determined that the copy control information of the contents is originally Copy Free.

On the other hand, when the copy control information is determined not to be Copy Free (CCI=00) in step S122, the process goes to step S125, and further whether the copy control information is Copy Once (CCI=10) or not is determined.

When the copy control information is determined to be Copy Once (CCI=10) (step S125; Yes), the process goes to step S126 because the recording of the contents is permitted. First, the path information and the copy control information are updated. By the operation of updating, the path information adding unit 212 newly inserts the path information, and the CCI inserting unit 211 updates Copy Once (CCI=10) to No More Copy (CCI=1011). Then, the process goes to step S124, and the recording operation of the contents is performed.

On the other hand, when the copy control information is determined not to be Copy Once (CCI=10) (step S125; No), the process goes out of the routine (the process does not go to step S126), and the recording operation of the contents is not performed. The case can be, for example, when the copy control information is Never Copy (CCI=11) and No More Copy (CCI=1011).

2nd Embodiment

Next, recording and reproducing control in a second embodiment will be explained with reference to FIG. 14 to FIG. 16.

First, the second embodiment will be schematically explained with reference to FIG. 14. Identically to FIG. 11, FIG. 14 is a table showing correspondent relations among the transmission path of the contents when passing through the paths J, M and P in FIG. 2, the copy control information and the path information. The concrete path is for transmitting the signal of the contents from the prerecorded disc 10 which records the contents supplied from the provider 9, to the reproducing apparatus 11 which is in conformity with the CPS, the recording apparatus 14 which is not in conformity with the CPS, the recording medium 62, the reproducing apparatus 16 which is not in conformity with the CPS, the recording apparatus 17 which is in conformity with the CPS and the recording medium 63 in sequence. FIG. 14 shows an example of a processed result by the recording apparatus which is not in conformity with the CPS and which forcibly changes the copy control information of the contents set to Never Copy (CCI=11) or Copy Once (CCI=10), not to Copy Free (CCI=00), but to Copy Once (CCI=10). In this case, the recording and reproducing control method shown in the first embodiment can not perfectly prevent the illegal copy.

Concretely, an explanation will be given with reference to the example shown in FIG. 14. When the copy control information which is originally set to the contents is Never Copy (CCI=11), if the signal of the contents is transmitted by the above-mentioned path, the recording is performed regardless of CCI=11 because the recording apparatus 14 is not in conformity with the CPS, and the copy control information is changed to Copy Once (CCI=10). The recording medium 62 thus produced is reproduced by the reproducing apparatus 16 which is not in conformity with the CPS. Since the copy control information of the contents reproduced by the reproducing apparatus 16 is not Copy Free (CCI=00) but Copy Once (CCI=10), the normal recording operation is performed by the recording apparatus 17 which is in conformity with the CPS. On the other hand, identically, when the copy control information which is originally set to the contents is Copy Once (CCI=10), the recording apparatus 14 which is not in conformity with the CPS performs the recording operation of the contents and changes the copy control information to Copy Once (CCI=10). In the contents obtained by reproducing the recording medium 62 thus produced by the reproducing apparatus 16 which is not in conformity with the CPS, the copy control information is not Copy Free (CCI=00) but Copy Once (CCI=10), and hence the recording apparatus 17 which is in conformity with the CPS performs the normal recording operation. Like this, in a case of passing through the recording apparatus which is not in conformity with the CPS and which forcibly changes the copy control information of the contents set to Never Copy (CCI=11) or Copy Once (CCI=10) not to Copy Free (CCI=00), but to Copy Once (CCI=10), the recording and reproducing control method according to the first embodiment cannot detect that the contents passed through the apparatus which is not in conformity with the CPS.

Therefore, the second embodiment adopts a method by which the recording and reproducing of the contents obtained by the above illegal copy can be inhibited and the protection of the copyright can be achieved. An explanation thereof will now be given in detail.

When recording the contents inputted as the analog signal by the recording apparatus, if the contents are MPEG moving pictures, for example, the contents are necessarily A/D converted and further MPEG-encoded. Thereafter, the processed data is recorded on the recording medium. The recording apparatus which is not in conformity with the CPS can record the contents for many times even though the copy control information is Copy Once (CCI=11) and Never Copy (CCI=10), and hence the process of the A/D conversion and the MPEG encoding is repeated. On the other hand, the recording apparatus which is in conformity with the CPS can record the contents of Copy Once (CCI=10) only once, except for the case that the copy control information is Copy Free (CCI=00) and the path information is not embedded. Namely, unless the copy control information is Copy Free (CCI=00), the recording apparatus which is in conformity with the CPS does not perform the process of the A/D conversion and the MPEG encoding of the same contents more than once. Thus, in the second embodiment, the contents passed through the illegal path are determined by taking account of that point. Concretely, "path information of an erased type", which means that the embedded path information is erased by repeating the process of the A/D conversion and the MPEG encoding is adopted. Further, "path information of a remaining type", which is embedded in a manner not to be erased even if the process of the A/D conversion and the MPEG encoding identical to the process utilized in the first embodiment is repeated, is also utilized together with the path information of the erased type. The above-mentioned two kinds of path information of the erased type and the remaining type are embedded in the contents. Thereby, when the two kinds of path information detected by the recording apparatus which is in conformity with the CPS do not correspond to each other, or when one of them is erased, it can be detected that the path information of the erased type is erased by the recording operation of the recording apparatus which is not in conformity with the CPS, i.e., that the contents passed through the illegal path.

Next, the description will be given of a concrete embodiment of a method of adding the path information in a manner that the path information can be erased by repeating the above-mentioned process of the A/D conversion and the MPEG encoding.

A first method is to embed the path information of the erased type not in the contents but in a blanking period of the analog signal at the time of outputting the analog signal from the reproducing apparatus. Generally, since a portion except an effective screen (e.g., a scanning line portion) is eliminated at the time of the MPEG encoding, if the path information is embedded in the position, the path information can be erased with the portion except the effective screen at the time of the MPEG encoding.

A second method is to embed the path information desired to be erased in lower 2 bits and the path information desired to remain in lower 3 bits, for example, if an original MPEG moving picture is an 8-bit digital video signal. The signal embedded as a small level being the lower 2 bits remarkably has high probability of being erased in a process of the A/D conversion and the encoding by an MPEG system, compared with the signal embedded in the lower 3 bits being a level larger than that embedded in the lower 2 bits. Therefore, the path information of the erased type is added to the lower small bits, and the path information of remaining type is added to the larger bits than it. It is noted that an area in which the above-mentioned path information is embedded needs to be within a range which scarcely affects the recording or reproducing of the contents.

A third method is to add the path information of the erased type to a portion of a high frequency component of the analog signal at the time of outputting the analog signal from the reproducing apparatus. Generally, at the time of the MPEG encoding, a method of cutting off the high frequency component of the signal to encode it is adopted. Therefore, if the path information is embedded in the high frequency component, the information is erased with higher possibility.

In the recording apparatus which is in conformity with the CPS, by re-embedding the path information erased by utilizing one of the above-mentioned three methods every time, it is possible to prevent a problem that the contents transmitted by the proper path cannot be recorded.

Next, the description will be given of an embodiment to which the recording and reproducing control method of the second embodiment is concretely applied with reference to FIG. 15. FIG. 15 is a table showing correspondent relations among the transmission path of the contents, the copy control information and the path information which are embedded in the contents. On the left column of the table, the input and output path of the contents is indicated. Moreover, when the signal of the contents is outputted as the analog signal, "ANALOG" is indicated. At the center column of the table, it is indicated how the copy control information is changed at the time of passing through the above-mentioned transmission path. In FIG. 15, it is assumed that the copy control information which is originally set to the contents is Never Copy (CCI=11), Copy Once (CCI=10) and Copy Free (CCI=00). When the copy control information which is originally set is Copy Free (CCI=00), the copy control information is not updated, and the path information is not written in. Therefore, the case is omitted from the illustration in the table. Further, on the right column of the table, the two kinds of path information embedded in the contents when passing through the above-mentioned transmission path are indicated, wherein the path information of the remaining type is indicated on the left column and the path information of the erased type is indicated on the right column.

Identically to FIG. 14, FIG. 15 is a table showing correspondent relations among the transmission path of the contents when passing through the paths J, M and P in FIG. 2, the copy control information and the path information. The concrete path is for transmitting the signal of the contents from the prerecorded disc 10 which records the contents supplied from the provider 9, to the reproducing apparatus 11 which is in conformity with the CPS, the recording apparatus 14 which is not in conformity with the CPS, the recording medium 62, the reproducing apparatus 16 which is not in conformity with the CPS, the recording apparatus 17 which is in conformity with the CPS and the recording medium 63 in sequence.

When the copy control information which is originally set to the contents is Never Copy (CCI=11), if the signal of the contents is transmitted by the above-mentioned path, the recording apparatus 14 which is not in conformity with the CPS performs the recording regardless of CCI=11, and changes the copy control information to Copy Once (CCI=10). At that time, the path information embedded as the erased type is erased by the A/D conversion and the MPEG encoding. The recording medium 62 thus produced is reproduced by the reproducing apparatus 16 which is not in conformity with the CPS. As for the contents reproduced by the reproducing apparatus 16, the copy control information is CopyOnce (CCI=10). However, since the recording apparatus 17 determines that one of the path information is erased, the recording is inhibited. On the other hand, identically, when the copy control information which is originally set to the contents is Copy Once (CCI=10), the recording apparatus 14 which is not in conformity with the CPS performs the recording operation of the contents and changes the copy control information to Copy Once (CCI=10). At that time, the path information embedded as the erased type is also erased by the A/D conversion and the MPEG encoding. As for the contents obtained by reproducing the recording medium 62 thus produced by the reproducing apparatus 16 which is not in conformity with the CPS, the recording apparatus 17 determines that one of the path information is erased, and hence the recording is inhibited.

Next, the description will be given of the recording operation performed by the information recording and reproducing apparatus 400 which is in conformity with the CPS in the second embodiment with reference to FIG. 16. It is noted that the reproducing operation in the second embodiment can be performed in a manner identical to the method of the reproducing operation explained in the first embodiment.

Figure 16:
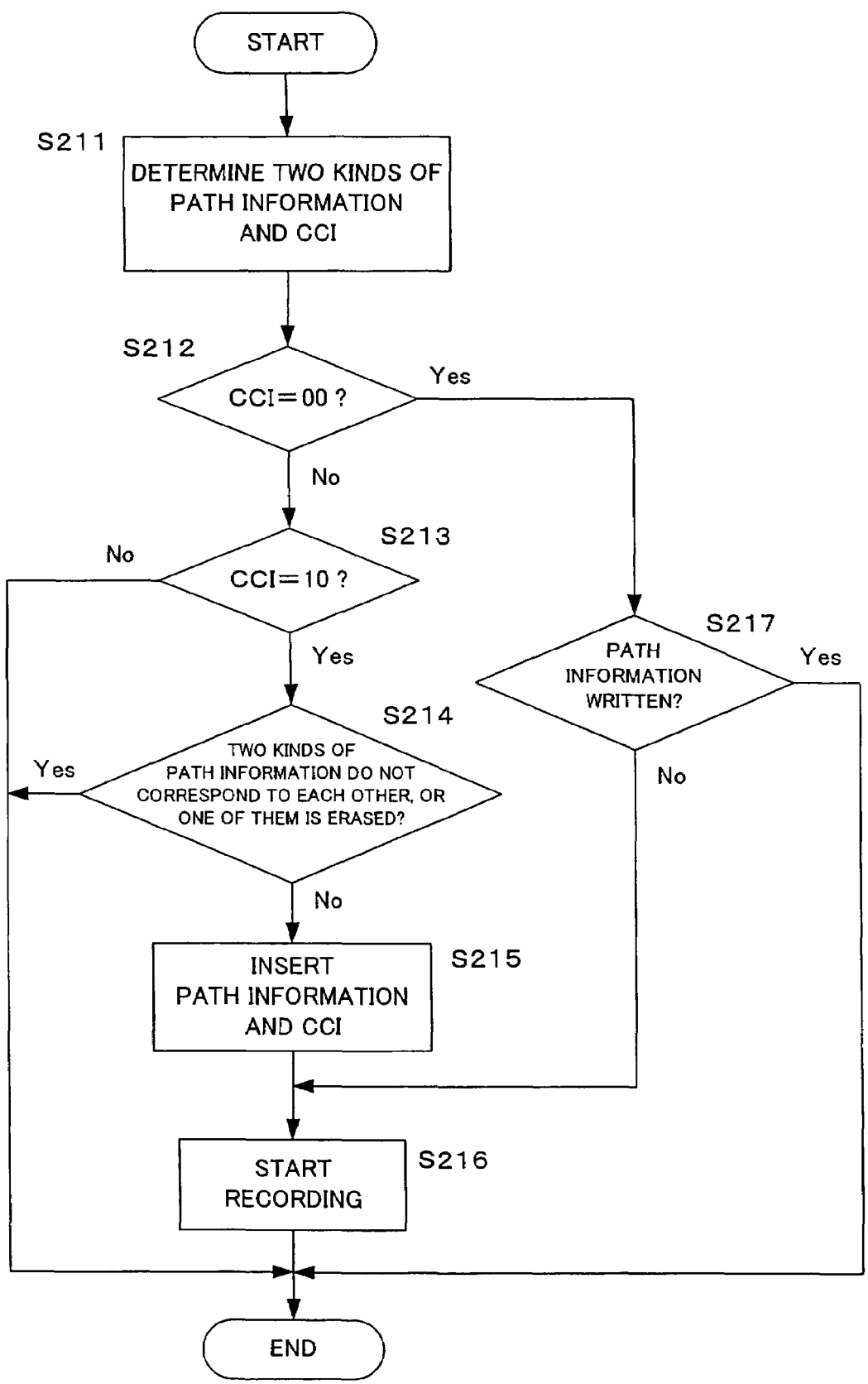
FIG. 16 is a flow chart showing a procedure of a recording process according to a second embodiment.

FIG. 16 is a flow chart showing the recording operation performed by the information recording and reproducing apparatus 400 which is in conformity with the CPS in the second embodiment. As described above, the process is executed by taking account of whether the two kinds of detected path information do not correspond to each other, or one of them is erased.

First, in step S211, the watermark detecting unit 209 and the path information detecting unit 210 detect the copy control information and the two kinds of path information embedded in the contents, which is supplied to the recording apparatus from the receiver or which is transmitted to the recording apparatus by reading out the recording medium. The CPU 213 or the drive control unit 301 determines the copy control information and the path information on the basis of the detected result. When one of the path information is completely erased, only the other path information is detected.

Next, in step S212, the CPU 213 or the drive control unit 301 determines whether the copy control information is Copy Free (CCI=00) or not on the basis of the determined result in step S211.

When the copy control information is determined not to be Copy Free (CCI=00) (step S212; No), the process goes to step S213, and whether the copy control information is Copy Once (CCI=10) or not is further determined.

When the determined result in step S213 is "No", the process goes out of the routine (the process does not go to steps S214 to S217), and the recording operation of the contents is not performed. In the case, the copy control information is CCI=11, CCI=1011 or the like.

On the other hand, when the copy control information is determined to be Copy Once (CCI=10) (step S213; Yes), the process goes to step S214, and whether the two kinds of detected path information do not correspond to each other or not, or one of them is erased or not is determined. Namely, in the case of passing through the recording apparatus which is not in conformity with the CPS, as described above, the copy control information is forcibly changed from CCI=11 or CCI=10 to CCI=10, however, one of the path information is erased or almost erased. Therefore, by determining whether the two kinds of detected path information do not correspond to each other, or one of them is erased, the recording of the contents passed through the illegal path can be inhibited. It is noted that the CPU 213 or the drive control unit 301 can execute the determination. When the determined result in step S214 is "Yes", the process goes out of the routine (the process does not go to steps S215 to S217), and the recording operation of the contents is not performed.

When the determined result in step S214 is "No", since the recording of the contents is permitted, the process goes to step S215, and the path information and the copy control information are updated. By the updating operation, the path information adding unit 212 inserts new path information, and the CCI inserting unit 211 updates Copy Once (CCI=10) to No More Copy (CCI=1011). At that time, the path information erased or almost erased may be re-embedded. After those processes are completed, the process goes to step S216, and the recording operation of the contents is performed.

On the other hand, when the copy control information is determined to be Copy Free (CCI=00) in step S212 (step S212; Yes), the process goes to step S217, and whether the path information is written in the contents or not is determined. In the case of passing through the apparatus which is not in conformity with the CPS, as described above, the copy control information is sometimes forcibly changed from CCI=11 or CCI=10 to CCI=00. When the copy control information is originally CCI=00, the path information which is normally not written is written. Thus, when the copy control information is Copy Free (CCI=00) and the path information is written, it means that the contents passed through the apparatus which is not in conformity with the CPS. If the determination is performed by taking account of that point, the recording of the contents passed through the illegal path can be inhibited. It is noted that the CPU 213 or the drive control unit 301 can also execute the determination.

When the determined result in step S217 is "Yes", the process goes out of the routine (the process does not go to step S216), and the recording operation of the contents is not performed. On the other hand, when the determined result in step S217 is "No", the process goes to step S216, the recording operation of the contents is performed. In the case, since the copy control information of the contents is determined to be originally Copy Free, the recording is not inhibited.

Though the present embodiment is explained by the example in a case that the copy control information is Copy Once, Never Copy and Copy Free, the copyright of the contents can be protected by the identical method in a system of setting a copy number.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-207289 filed on Aug. 12, 2003 including the specification, claims, drawings and summary is incorporated herein by reference in its entirety.

What is claimed is:

1. An information processing apparatus which records information signal corresponding to contents in accordance with copy control information, comprising:
 a path information detecting unit which detects path information embedded in the information signal and indicating information of a path through which the information signal passes;
 a control unit which controls recording of the information signal corresponding to the contents on the basis of the copy control information and path information detected by the path information detecting unit; and
 a path information adding unit which adds new path information to the path information detected by the path information detecting unit when the information signal corresponding to the contents is inputted or outputted,
 wherein the path information adding unit adds first and second adding path information as the new path information,
 wherein the first adding path information is path information of a remaining type which is not erased even if an encoding process for recording the information signal and an A/D converting process which converts the information signal corresponding to the contents from the digital signal to the analog signal are repeated by the information processing apparatus,
 wherein the second adding path information is path information of an erased type which is erased by repeating the encoding process and the A/D converting process, and
 wherein the second adding path information is added to a high frequency component of the analog signal when the information signal corresponding to the contents is outputted as the analog signal.

2. The information processing apparatus according to claim 1, wherein the path information adding unit adds:
 analog signal information which indicates that an attribute of the information signal is an analog signal when the information signal corresponding to the contents is inputted to the information processing apparatus as the analog signal or is outputted from the information processing apparatus as the analog signal;
 supplying medium attribute information which indicates an attribute of a medium supplying the information signal to be recorded or reproduced by the information processing apparatus when the information signal corresponding to the contents is inputted to the information processing apparatus as a digital signal; and
 recording/transmitting medium attribute information which indicates an attribute of a recording medium or a transmission medium in or to which the information signal to be recorded or reproduced by the information processing apparatus is recorded or transmitted when the information signal corresponding to the contents is outputted from the information processing apparatus as the digital signal.

3. The information processing apparatus according to claim 1, wherein the path information adding unit does not add the path information to the information signal corresponding to the contents when the copy control information indicates a code of permitting free copy of the contents.

4. The information processing apparatus according to claim 2, wherein the control unit inhibits reproducing of the information signal corresponding to the contents when the supplying medium attribute information or the recording/transmitting medium attribute information is not added at the end of the path information detected by the path information detecting unit.

5. The information processing apparatus according to claim 3, wherein the control unit inhibits recording of the information signal corresponding to the contents when the copy control information indicates a code of permitting free copy of the contents and the path information detecting unit detects the path information.

6. The information processing apparatus according to claim 1, wherein the second adding path information is added to a blanking period of the information signal when the information signal corresponding to the contents is outputted as the analog signal.

7. The information processing apparatus according to claim 1, wherein the second adding path information is added to a predetermined lower bit of the information signal corresponding to the contents, and wherein the first adding path information is added to a bit range including a higher bit than the bit to which the second adding path information is added.

8. The information processing apparatus according to claim 1, wherein the control unit inhibits the recording of the information signal corresponding to the contents when the first and second adding path information which the path information detecting unit detects do not correspond to each other, or one of the first and second adding path information is erased.

9. An information processing apparatus which reproduces information signal corresponding to contents in accordance with copy control information, comprising:
 a path information detecting unit which detects path information embedded in the information signal and indicating information of a path through which the information signal passes;
 a control unit which controls reproducing of the information signal corresponding to the contents on the basis of the copy control information and path information detected by the path information detecting unit; and
 a path information adding unit which adds new path information to the path information detected by the path information detecting unit when the information signal corresponding to the contents is inputted or outputted, wherein the path information adding unit adds first and second adding path information as the new path information, wherein the first adding path information is path information of a remaining type which is not erased even if an encoding process for recording the information signal and an A/D converting process which converts the information signal corresponding to the contents from the digital signal to the analog signal are repeated by the information processing apparatus, wherein the second adding path information is path information of an erased type which is erased by repeating the encoding process and the A/D converting process, and wherein the second adding path information is added to a high frequency component of the analog signal when the information signal corresponding to the contents is outputted as the analog signal.

10. An information processing method which records an information signal corresponding to contents in accordance with copy control information, comprising:

a path information detecting process which detects path information embedded in the information signal and indicating information of a path through which the information signal passes;

a control process which controls recording of the information signal corresponding to the contents on the basis of the copy control information and the path information detected by the path information detecting process; and a path information adding process which adds new path information to the path information detected by the path information detecting process when the information signal corresponding to the contents is inputted or outputted, wherein the path information adding process adds first and second adding path information as the new path information, wherein the first adding path information is path information of a remaining type which is not erased even if an encoding process for recording the information signal and an A/D converting process which converts the information signal corresponding to the contents from the digital signal to the analog signal are repeated by the information processing method, wherein the second adding path information is path information of an erased type which is erased by repeating the encoding process and the A/D converting process, and wherein the second adding path information is added to a high frequency component of the analog signal when the information signal corresponding to the contents is outputted as the analog signal.

11. An information processing method which reproduces an information signal corresponding to contents in accordance with copy control information, comprising:

a path information detecting process which detects path information embedded in the information signal and indicating information of a path through which the information signal passes;

a control process which controls reproducing of the information signal corresponding to the contents on the basis of the copy control information and the path information detected by the path information detecting process; and a path information adding process which adds new path information to the path information detected by the path information detecting process when the information signal corresponding to the contents is inputted or outputted, wherein the path information adding process adds first and second adding path information as the new path information, wherein the first adding path information is path information of a remaining type which is not erased even if an encoding process for recording the information signal and an A/D converting process which converts the information signal corresponding to the contents from the digital signal to the analog signal are repeated by the information processing method, wherein the second adding path information is path information of an erased type which is erased by repeating the encoding process and the A/D converting process, and wherein the second adding path information is added to a high frequency component of the analog signal when the information signal corresponding to the contents is outputted as the analog signal.

12. The information processing apparatus according to claim 1, wherein the path information includes information indicating whether the information signal is inputted/outputted as an analog signal or as a digital signal.

* * * * *